(12) United States Patent
Sasaki

(10) Patent No.: US 9,245,189 B2
(45) Date of Patent: Jan. 26, 2016

(54) OBJECT APPEARANCE FREQUENCY ESTIMATING APPARATUS

(75) Inventor: Mikio Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 768 days.

(21) Appl. No.: 13/290,340

(22) Filed: Nov. 7, 2011

(65) Prior Publication Data

US 2012/0133497 A1    May 31, 2012

(30) Foreign Application Priority Data

Nov. 29, 2010    (JP) ................................. 2010-265138

(51) Int. Cl.
| | | |
|---|---|---|
| *B60Q 1/00* | (2006.01) | |
| *G06K 9/00* | (2006.01) | |
| G06N 5/04 | (2006.01) | |
| G08G 1/0969 | (2006.01) | |
| H04W 4/02 | (2009.01) | |

(52) U.S. Cl.
CPC .............. *G06K 9/00805* (2013.01); *G06N 5/04* (2013.01); *G08G 1/0969* (2013.01); *H04W 4/028* (2013.01)

(58) Field of Classification Search
USPC ....................... 340/995.24, 905, 995.13, 7.48; 701/438, 414, 423
See application file for complete search history.

(56) References Cited

U.S. PATENT DOCUMENTS

| | | | |
|---|---|---|---|
| 6,944,539 B2 * | 9/2005 | Yamada et al. ................ 701/428 |
| 7,065,525 B1 | 6/2006 | Sasaki et al. | |
| 8,620,532 B2 * | 12/2013 | Curtis et al. ..................... 701/50 |
| 2006/0206256 A1 | 9/2006 | Kumagai et al. | |
| 2007/0047809 A1 | 3/2007 | Sasaki | |
| 2007/0230792 A1 * | 10/2007 | Shashua et al. ............... 382/190 |
| 2008/0097699 A1 * | 4/2008 | Ono ............................... 701/300 |
| 2009/0082948 A1 | 3/2009 | Hiruta et al. | |
| 2009/0140887 A1 * | 6/2009 | Breed et al. ................... 340/990 |
| 2009/0279738 A1 | 11/2009 | Sasaki | |
| 2011/0098877 A1 * | 4/2011 | Stahlin et al. ................... 701/33 |

FOREIGN PATENT DOCUMENTS

| | | |
|---|---|---|
| JP | A-H10-293896 | 11/1998 |
| JP | A-H11-039587 | 2/1999 |
| JP | A-2006-31443 | 2/2006 |

(Continued)

OTHER PUBLICATIONS

Office Action mailed Dec. 25, 2012 in corresponding JP Application No. 2010-265138 (and English translation).

*Primary Examiner* — Fekadeselassie Girma
*Assistant Examiner* — John Bamert
(74) *Attorney, Agent, or Firm* — Posz Law Group, PLC

(57) ABSTRACT

An estimation apparatus of an object appearance frequency is provided. The apparatus estimates an appearance frequency of objects, such as pedestrians, in a predetermined estimation area. The apparatus calculates a matrix $F_{PFP}$ by searching an appearance frequency data in the past. In detail, an estimated result that is an output of an estimating module is expressed as a vector. Objects to be estimated are classified into a total of 12 kinds, such as a "man, woman, child, bike, unknown, dog" and a "right, left". Feature vector of appearance frequency of pedestrians, i.e., objective variables of estimation, is expressed by 12th dimension vector space. Moreover, status information is used as explaining variables, which explain the feature vectors when a feature vector occurs. The regression relationship of the feature vector with respect to the status information vector expressed in 28th dimension is solved by the linear least squares method.

22 Claims, 18 Drawing Sheets

(56) References Cited

FOREIGN PATENT DOCUMENTS

| JP | A-2007-189704 | 7/2007 |
| JP | A-2007-279970 | 10/2007 |
| JP | A-2008-146549 | 6/2008 |
| JP | B2-4150093 | 7/2008 |
| JP | A-2009-151359 | 7/2009 |
| JP | B2-4349351 | 7/2009 |

* cited by examiner

FIG. 17

OBJECT APPEARANCE FREQUENCY ESTIMATING APPARATUS

CROSS REFERENCE TO RELATED APPLICATION

This application is based on Japanese Patent Application No. 2010-265138 filed on Nov. 29, 2010, the contents of which are incorporated herein by reference in its entirety.

FIELD OF THE INVENTION

The present invention relates to a technique and an apparatus for estimating an object appearance frequency. The apparatus estimates an appearance frequency of an object to be estimated on an outside of a vehicle in a predetermined area. The area to be estimated may be a predetermined area on a scheduled driving path.

BACKGROUND OF THE INVENTION

JP4329711B discloses a technique for estimating a traveling time or for forecasting a traffic condition based on information of vehicle position collected by a probe car. This technique recovers missing data by using Principal Component Analysis with Missing Data (PCAMD) which is not a simple Regression Analysis. Theoretically, the technique is established based on Principal Component Analysis with restriction.

JP2007-060273A and JP2007-072987A disclose an apparatus in which a reliability or certainty of an object which may exists in an image is expressed by the multi-variable linear regression model applied to feature amount of image data.

JP2009-271758A discloses an apparatus for recognizing a pedestrian in an image.

SUMMARY OF THE INVENTION

If it is possible to estimate an appearance frequency of object, such as a pedestrian and a bike (bicycle) in a predetermined area, it may be allowed to improve safety of a pedestrian and a bike, and also it will contribute to reduce a driver's burden for safety driving. However, JP4329711B mainly relying on information about the vehicle, i.e., a location of the vehicle, and is not the one that uses an observed amount of an environment outside the vehicle, i.e., the observed amount, such as the number of pedestrians, and the number of other vehicles. In addition, moving characteristics of vehicles is considered to be different from moving features and appearing features of pedestrians and other vehicles, therefore, it is impossible to apply the traffic congestion predicting technology of vehicles to a device for estimating and predicting about pedestrians as it is.

It is an object of the present invention to provide an estimation apparatus of an object appearance frequency which is capable of estimating an appearance frequency of an object, such as pedestrians, in a predetermined estimation area.

According to a preferred embodiment of this invention, an object appearance frequency estimating apparatus is provided. The apparatus is mountable on a vehicle. The apparatus is capable of estimating an appearance frequency of an object on an outside of the vehicle in a predetermined estimation area. The predetermined area may be set on a scheduled driving path of the vehicle. Here, an object is mainly a human, but may include a bike, and an animal, such as a dog etc. The scheduled driving path may be obtained by a path searched by a navigation module, for example.

At this time, a frequency data acquisition module acquires frequency data about an appearance frequency in the past. This frequency data may include "space-time information" defining the space-time, and "frequency information" which defines an appearance frequency of an object and corresponds to the space-time information. Such frequency data may be stored in a storage module in the estimation apparatus, or in a center which is provided on the outside. In a case that the frequency data is stored in the external center, a frequency data acquisition module acquires the frequency data by data communications with the center. Then, based on such frequency data, the appearance frequency of the object in predetermined estimation area is estimated by an estimating module.

According to a preferred embodiment of this invention, frequency data about the appearance frequency in the past is stored and accumulated in the vehicle or in the center.

Thereby, it is possible to estimate the appearance frequency of objects, such as a pedestrian, in the predetermined estimation area appropriately.

In addition, the space-time information may be defined as a status information vector which uses status information as explaining variables. The status information may include information about the place, the day and time, and the weather.

The frequency information may be defined as a feature vector which is expressed by an objective variable. Feature information is used as the objective variable. The feature information may include information about kind of objects and information about partial area which is provided by dividing a view from the vehicle into a plurality of areas.

By using such a status information vector and a feature vector, it is possible to perform estimation comparatively easily. The estimating module may estimate appearance frequencies of objects in the predetermined estimation area by solving the regression relationship of the feature vector with respect to the status information vector by using the linear least squares method.

In a case that it is considered to accumulate frequency data to the center, the apparatus may include a camera module which captures an image of view from the vehicle, and a recognition module which generates frequency information from an image recognition result based on the image captured by the camera module. In this case, since the recognition module generates the frequency information, it is possible to collect frequency data on the vehicle.

However, the image recognition result by a recognition module has a possibility that it may be affected by influence by various factors. In order to reduce the influence, the apparatus may include a calculating module which calculates a reliability degree for the image recognition result by the recognition module. For example, the calculating module calculates the reliability degree based on at least one of the following factors, a kind of object, a sensing place, a sensor and recognition technique for image recognition, and a driving speed of the vehicle. By calculating the reliability degree, it is possible to perform weighting process for accumulated results of the image recognition result by using the reliability degree as a weight. As a result, it is possible to use the image recognition results by the recognition module as learning data of the estimating module.

In a case that it is assumed to include the recognition module, the apparatus may include a transmitting module which uploads upload information including information about a point where the vehicle runs and the result of image recognition by the recognition module to a center which handles the upload information. Thereby, the vehicle, which carries the estimation apparatus, may be worked and functioned as a probe car.

At this time, the uploaded information may include a reliability degree calculated in the computing module. Thereby, since the image recognition result with the reliability degree is uploaded to the canter, it is possible to perform a weighting evaluation to the image recognition results accumulated in the center by using the reliability degrees as weighting data. The upload information may include a result of the estimating module. Thereby it is possible to deliver a result of estimation from the center to a vehicle that has no estimating module. Of course, even in a case that the estimation result is not transmitted to the center, the estimation processing may be performed by the center and the estimation result obtained in the center may be distributed to the vehicles.

By the way, in a case that a quality or quantity of learning data is not enough, the estimation result by the estimating module and the image recognition result by the recognition module may differs greatly. Since the image recognition result by the recognition module can be used as the learning data of the estimating module, a problem of improving the estimating module may be concluded as a problem of improving performance of the recognition module.

For this reason, it may be considered that the apparatus can include a module which acquires, in a case that a differential between a result of estimation by the estimating module and a result of image recognition by the recognition module is equal to or more than a threshold value, the uploaded information accumulated in the center. Thereby, it is possible to improve a possibility that the quality and quantity of learning data of the recognition module are improved. As a result, it is possible to contribute to reduce the differential between the estimation result by the estimating module and the image recognition result by the recognition module.

According to the other aspect of this invention, an object appearance frequency estimation apparatus is provided. In an embodiment, the apparatus uses a feature to improve performance of a recognition module by learning data. The apparatus is mountable on a vehicle. The apparatus is capable of estimating an appearance frequency of an object on an outside of the vehicle in a predetermined estimation area. The predetermined area may be set on a scheduled driving path of the vehicle. The apparatus may include an estimating module which estimates an appearance frequency of an object in a predetermined estimation area based on the frequency data about an appearance frequency in the past. The apparatus may include a camera module which captures view from the vehicle. The apparatus may include a recognition module which generates the frequency information defining the frequency data based on a result of image recognition on an image captured by the camera module. In this embodiment, it is premised that the image recognition result with the reliability degree is accumulated in the center which is provided on an outside of the vehicle. The apparatus may include a module which acquires the image recognition result accumulated in the center as learning data of the recognition module, in a case that a differential between a result of estimation by the estimating module and a result of image recognition by the recognition module is equal to or more than a threshold value.

In order to improve the performance of image recognition, it is possible to set a recognition parameter. The apparatus may include a parameter setting module which sets a recognition parameter for image recognition into the recognition module.

In detail, the parameter setting module sets at least one of the recognition parameter based on data of appearance frequency in the past. For example, in a place where many groups commuting to school are expected, it is preferable to set the recognition parameters thought to be suited for recognizing a plurality of groups of object. For example, in a place where many bikes are expected, it is preferable to set the recognition parameters especially adjusted for bikes.

In detail, the parameter setting module sets the recognition parameter in accordance with a target object. For example, a setting based on a movement degree and moving range of an object, or a setting based on image feature of an object may be employed.

By employing the above configuration, it is possible to contribute to improve an image recognition performance.

The parameter setting module may correct the recognition parameter in a case that a differential between a result of estimation by the estimating module and a result of image recognition by the recognition module is equal to or more than a threshold value. Thereby, it is possible to improve the performance the recognition module.

According to the other aspect of this invention, an object appearance frequency estimating apparatus is provided. In an embodiment, the apparatus uses a feature to improve performance of a recognition module by a recognition parameter. The apparatus is mountable on a vehicle. The apparatus is capable of estimating an appearance frequency of an object on an outside of the vehicle in a predetermined estimation area. The predetermined area may be set on a scheduled driving path of the vehicle. The apparatus may include an estimating module which estimates an appearance frequency of an object in a predetermined estimation area based on the frequency data about an appearance frequency in the past. The apparatus may include a camera module which captures view from the vehicle. The apparatus may include a recognition module which generates the frequency information defining the frequency data based on a result of image recognition on an image captured by the camera module. The apparatus may include a parameter setting module which sets a recognition parameter for image recognition into the recognition module. The parameter setting module corrects the recognition parameter in a case that a differential between a result of estimation by the estimating module and a result of image recognition by the recognition module is equal to or more than a threshold value.

It is preferable to estimate an appearance frequency of an object based on a geographical factor etc., even when there is little amount of frequency data in the past. To answer such a request, it may be considered to adopt the following configuration. The apparatus may include an attractor information acquisition module which acquires information about an attractor, and a time gate setting module which sets up a time gate which shows an existence probability of the object in the attractor based on information about the attractor.

The attractor may include a school, a store, a shopping center, a hospital, a station, a theme park, a hall, a baseball stadium, a bus stop, a terminal, a park, etc. A time gate shows existence probability of the object in the attractor. The existence probability is influenced by time factor. For example, a time gate may be set up based on a business hours of an attractor, etc.

In an embodiment, the estimating module estimates the appearance frequency of the object in the predetermined estimation area by considering a distance between the attractor and the predetermined area and the time gate.

Thereby, even when there is little amount of frequency data in the past, it is possible to estimate an appearance frequency of an object based on a geographical factor etc.

In detail, for example, the time gate may be defined as a rectangular wave which has height corresponding to the appearance frequency of the object. In this case, the estimating module estimates the appearance frequency of the object in the predetermined estimation area by considering propagation of the rectangular wave which is divided at a branch from the attractor to the predetermined area. For example, in a branch, the rectangular wave may be divided into a plurality of waves each of which has height (object appearance frequency) that is lower than the original rectangular wave. It is possible to estimate the appearance frequency of the object resulting from the attractor comparatively easily.

Furthermore, the rectangular wave defining the time gate may be initialized to have height corresponding to an average accommodation number of an attractor. Thereby, it is possible to define and handle the time gate as a comparatively simple rectangular wave.

For example, in a case that a commuting time range to go to a certain school is from 8:00 AM to 8:30 AM, it is necessary to estimate the appearance frequency of the object (for example, student) at time before the commuting time. For such purpose, the estimating module may estimate an appearance frequency of an object in a predetermined estimation area based on the reverse propagation in which the rectangular wave propagates in a reverse direction of time. Thereby, it is possible to estimate an appearance frequency of an object at that time or at the time before based on a time when the object comes to or arrives to an attractor or when the object leaves from the attractor.

In addition, the estimating module may estimate the appearance frequency of the object in the predetermined area by considering a passing time of the vehicle in the predetermined area. That is, since the passing time for the predetermined area becomes short as a speed of the vehicle increases, it is possible to estimate the appearance frequency of the object more certainly by taking the passage time in the predetermined area into consideration.

According to the other aspect of this invention, an object appearance frequency estimating apparatus is provided. In an embodiment, the apparatus uses a feature to perform estimation depending upon an attractor. The apparatus is mountable on a vehicle. The apparatus is capable of estimating an appearance frequency of an object on an outside of the vehicle in a predetermined estimation area. The predetermined area may be set on a scheduled driving path of the vehicle. The apparatus may include an estimation module which estimates an appearance frequency of an object in a predetermined estimation area. The apparatus may include an attractor information acquisition module which acquires information about an attractor which is an element being capable of attracting people and of driving those people to come to there and leave from there. The apparatus may include a time gate setting module which sets up a time gate which shows an existence probability of the object in the attractor, the existence probability being affected by a time factor, and wherein The estimating module estimates the appearance frequency of the object in the predetermined estimation area by considering a distance between the attractor and the predetermined area and the time gate.

BRIEF DESCRIPTION OF THE DRAWINGS

Additional objects and advantages of the present invention will be more readily apparent from the following detailed description of preferred embodiments when taken together with the accompanying drawings. In which:

FIG. 17 is a diagram showing an example of a status information vector and a feature vector;

DETAILED DESCRIPTION OF THE PREFERRED EMBODIMENTS

Figure 1:
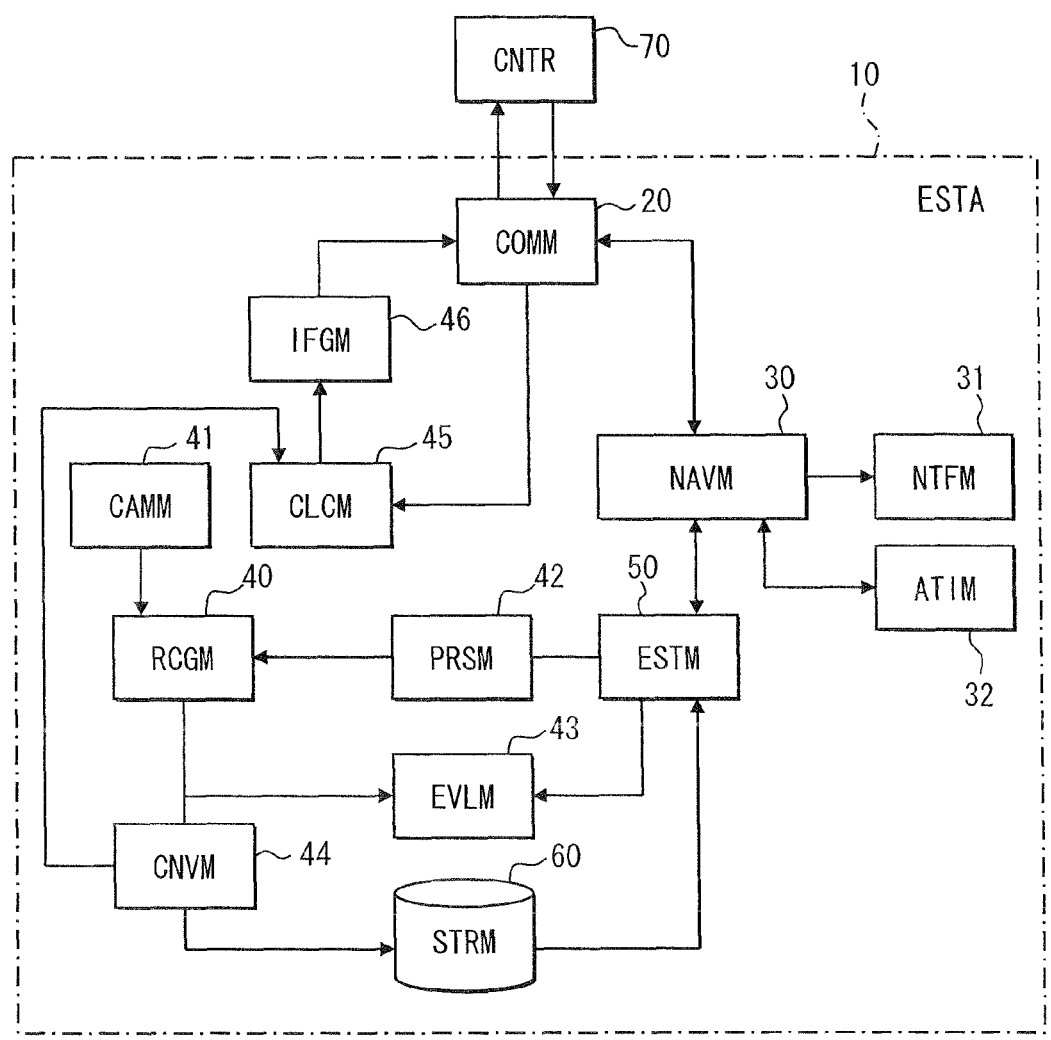
FIG. 1 is a block diagram showing a vehicle mountable estimation apparatus according to a first embodiment of the present invention.

Hereafter, an embodiment of the present invention is explained based on drawings. In this embodiment, the apparatus estimates or predicts an appearance frequency of an object, such as a pedestrian, a bike, and an animal, which may be observed and appeared in a predetermined estimation area within an expected time range. The predetermined estimation area may also be referred to as a target or a target area.

1. Feature (1) The apparatus and method estimate an appearance frequency of a pedestrian (pedestrian appearance frequency) in a predetermined estimation area at a scheduled driving time by taking a customer-attracting facility in the neighborhood of the scheduled driving area and a behavior of its customers into consideration in view of a geographic factor and a road factor. The predetermined estimation area corresponds to an area on a map. The scheduled driving time corresponds to the expected time range at which the vehicle passes through the predetermined estimation area.

(2) The apparatus and method are designed to minimize inputs of correct answer data by a human by using a result of a recognition module collected by a probe car when estimating the pedestrian appearance frequency at the scheduled driving time based on statistical data about an appearance frequency in the past.

(3) The apparatus and method are designed to take information about a reliability degree of recognition into consideration when using the result of the above-mentioned recognition module.

(4) The apparatus and method are designed to improve performance of the recognition module and an estimating module by evaluating differential information between the latest recognition result obtained when the vehicle passes through the scheduled driving area, and the pedestrian appearance frequency obtained by the above-mentioned framework in advance.

2. Practical Application

The apparatus and method may be applied to a driver support system which may detect an object, such as a bike (bicycle), a pedestrian, an animal, in a view of a camera mounted on the vehicle, and generate a warning to a driver about an object approaching to the camera. As application program, roughly divided, there may be the following three parts.

2-1. People Forecast

This part estimates an appearance of people and bikes by sharing information sensed and provided by a plurality of sensors. Thereby, this part estimates the appearance frequency of person in an appointed place beforehand like a weather forecast, utilizes it as city information.

2-2. Driving Support

This part provides a caution, a risk maneuver, a device setup, a change of travel plan, a change of driver, a change of driving plan, in response to a result of the people forecast, and promotes preventive measures for safety. That is, this part may display a recognition result in an emphasized manner, such as with a red flame, or generate a warning sign. In addition, from a viewpoint of finally reducing an accident, this part may provide information from a driving support so that danger may be avoided in advance.

For example, in a case that a driver drives a rent-a-car through a place as a stranger, a driver's mental burden may be reduced if it is possible to know about a place and a time range where the driver could meet a pedestrian or a bike with high probability in advance.

2-3. Recognition Support

This part improves recognition performance is made to improve by making the above-mentioned prediction result and the recognition result by a probe car cooperate by a means of communication.

(1) This part may improve recognition performance by external data, especially data relating to the weather and environment, obtained by communication.

(2) This part may improve recognition function by increasing an amount of operations and contents of processing by being connected with an external processing unit via communication.

(3) This part may improve recognition performance of each vehicle by allowing a plurality of sensors to cooperate in a manner that data observed in a plurality of space-time points are used each other.

(4) This part may adjust recognition performance by obtaining recognition parameters which are matched for a regional area, a time, or the weather via communication.

3. Estimation Methods

First, available estimation methods are described. The apparatus estimates an appearance frequency of a pedestrian (pedestrian appearance frequency) in a scheduled driving zone based on a space-time distribution of reliability degrees of recognition results. The reliability degrees and the recognition results are stored and memorized on a map data, i.e., in associated with a map data. The reliability degrees of recognition results are determined in accordance with characteristics of a sensing device (source), a time range, and a point (location on a map.)

Regarding a group including M estimated values of the appearance frequencies, values of estimated appearance frequency with respect to objects of N categories may be expressed in "M×N" matrix "F". Regarding a status "s" including time information, and a place "x" assumed to be estimated, the matrix F(x, s), which is arranged by the estimated values of appearance frequency, may be modeled by the following formula.

$$F(x,s) = \Lambda(F_{RWP}, F_{RXT}, F_{PFP}, F_{ATR}) \quad \text{(FORMULA 1)}$$

Here, a matrix $F_{RWP}$ is an estimated appearance frequency on the place x. The estimated appearance frequency is calculated from the image recognition result obtained on an area surrounding a scheduled driving path from the vehicle or its present location to the place "x".

The matrix $F_{RXT}$ is a result of a recognition performed on an image observed on the place "x" at right now or recently. The matrix $F_{PFP}$ is a result of an appearance frequency estimation performed on the place "x" and the status "s" based on statistical data in the past.

The matrix $F_{ATR}$ is an estimated appearing amount based on an influence of attractors around the place "x". This will be corrected to higher-precision information by a time gate. In addition, $\Lambda$ (Lambda) is a function which creates single appearance frequency matrix from the four above-mentioned appearance frequency matrixes. One of the simplest functions may be expressed by the following formula.

$$F(x, s)^{[0]} = \frac{1}{4}(F_{RWP} + F_{RXT} + F_{PFP} + F_{ATR}) \quad \text{(FORMULA 2)}$$

3-1. First Estimation Method

One of the easiest methods to practice may be as follows.

$$F = F_{ATR} \quad \text{(FORMULA 3)}$$

This estimation may have similar meanings to traffic signboards, such as "caution for ones dash", "school zone", "school crossing" and "caution for animals". However, in this embodiment, in order to respond to a request for estimation of appearance frequency on an arbitrary zone around a target place and path, influence of a plurality of attractors are expressed in a quantitative manner by consolidating influences of the plurality of attractors.

3-2. Second Estimation Method

In a case that statistical data in the past is already available, the matrix may be expressed as follows by using the matrix $F_{PFP}$.

$$F(x, s)^{[1]} = \frac{1}{(w_{PFP} + w_{ATR})}(w_{PFP} \cdot F_{PFP} + w_{ATR} \cdot F_{ATR}) \quad \text{(FORMULA 4)}$$

Although the matrix $F_{PFP}$ fundamentally shows a regressive estimation based on learning processing of the past data, this method has an advantage that it is possible to perform compensation by the matrix FATR in a case of missing data.

3-3. Third Estimation Method

In a case that a distance to a target is short enough and appearance frequency will be merely varied only a small within a traveling time to the target, the matrix may be expressed by the following formula with emphasis on result from a recognition module which exists around a target.

$$F = F_{RXT} \quad \text{(FORMULA 5)}$$

In this case, it is difficult to practice the method unless the apparatus is configured with both a recognition system and a communication system, which can be performed in semi-real-time manner and in highly precision manner. This system is rather convenient for estimation of an appearance frequency of a crowd which is difficult to estimate based on data in the past. If a recognition system is not enough, it may be possible to deliver and get an image from an outside device to the vehicle. In this case, discussions may be concluded in a problem of a radio communication system by a probe car.

3-4. Estimation Method in Embodiments

With respect to the matrix $F_{RWP}$, the method may be performed by calculating a correlation between the appearance frequency observed at a space-time point on a place different from the target and the appearance frequency on the target. A problem of handling the matrix FRWP becomes the same as that of the matrix $F_{PFP}$. Therefore, in this embodiment, the following description is provided mainly based on the formula 4 above.

4. Providing Information to Estimating Module

It is assumed that the information used for the estimating module of this system is provided from the following sources.

(1) Vehicles (Estimation Apparatus)

The estimation apparatus may be configured in the following three types, i.e., embodiments.

(1-1) Type 1 (First Embodiment): This type includes both a recognition module and an estimating module and performs data communication with a center.

(1-2) Type 2 (Second Embodiment): This type includes an estimating module only and performs data communication with a center.

(1-3) Type 3 (Third Embodiment): This type only notifies information to a user on the vehicle based on information provided by performing data communication with a center.

(2) Wireless-Communication Terminals, such as Mobile Phone or PC

The wireless-communication terminals transmit data to vehicles existing around it or the center. Data may include position information which is sensed by the terminal and individual profile information stored in the terminal. By receiving data from the terminals, it is possible to associate pedestrian's information, which is difficult to be recognized by using sensing, such as image recognition, with a map with high reliability. In other words, it is possible to perform mapping processing of the pedestrian's information onto a map. The pedestrian's information may include sex, age, destination, etc. It is not impossible to sense and detect the other pedestrians by a terminal held by one of the pedestrians. However, a basic usage of the terminal is that the terminal is used as means for transmitting a walking status of a pedestrian who holds the terminal.

(3) Fixed Point Observation Infrastructure

Fixed point observation infrastructure, FPOI, may include terminals, such as cameras on a road side. A position of each FPOI terminals is fixed. Compared with a case where pedestrians are sensed and recognized from a moving article, such as a vehicle, there is a very small amount of motions on a background view. Therefore, it is possible to perform higher recognition rate of a pedestrian than that recognized from the vehicles. Therefore, it is possible to improve a reliability degree of estimation. On the other hand, since the installation number of the terminals and locations of the terminals are restricted in view of cost, the area where estimation can be performed is also limited.

5. Configuration of Estimation Apparatus

FIG. 1 is a block diagram showing a vehicle mountable estimation apparatus (ESTA) 10 according to the type 1. The estimation apparatus 10 includes the following main components, such as a data communication module (COMM) 20, a navigation module (NAVM) 30, a recognition module (RCGM) 40, an estimating module (ESTM) 50, and a storage module (STRM) 60.

The data communication module 20 is a component for performing data communications with the center (CNTR) 70. The navigation module 30 includes a notifying module (NTFM) 31 and an attractor information storage module (ATIM) 32, and is connected with the estimating module 50. The notifying module 31 may include at least one component, such as a display and a speakers, etc., for notifying information to a driver in the vehicle. The attractor information storage module 32 and attractor information stored therein are mentioned later.

The estimation apparatus 10 includes a camera module (CAMM) 41, a parameter setting module (PRSM) 42, an evaluation module (EVLM) 43, and a conversion module (CNVM) 44, which are operatively connected with the recognition module 40. The estimation apparatus 10 includes a calculating module (CLCM) 45 connected with the conversion module 44 and an information generating module (IFGM) 46 connected with the calculating module 45.

The estimating module 50 is operatively connected to the parameter setting module 42 and the evaluation module 43. The storage module 60 may be provided by a data storage medium, such as a semiconductor memory device and a magnetic disc device, for memorizing the information from the conversion module 44. The camera module 41 is embodied as an on-vehicle camera, and sends out image data to the recognition module 40. The camera module 41 may be referred to as an image capturing module. The parameter setting module 42 sets recognition parameters for image recognition processing to the recognition module 40. The parameters are described later. The evaluation module 43 is configured as a module for evaluating outputs from the estimating module 50 and outputs from the recognition module 40. Specifically, the evaluation module 43 calculates differential information on the outputs from the estimating module 50 and the outputs from the recognition module 40. The differential information is converted by the conversion module 44. The converted differential information is sent out to the storage module 60 and the calculating module 45.

The recognition module 40 outputs an image recognition result. The image recognition result is also converted by the conversion module 44. The converted image recognition result is stored in the storage module 60. The converted image recognition result is also sent out to the calculating module 45. The calculating module 45 calculates a degree of reliability for the image recognition result.

The information generating module 46 generates information to be uploaded to the center 70 by adding the reliability degree etc., which were calculated by the calculating module 45, to the image recognition result. The estimating module 50 is configured as a module for estimating a pedestrian appearance frequency. The estimating module 50 acquires information transmitted from the center 70 through the navigation module 30, and performs estimating processing based on the information received from the center 70. The estimating module 50 performs estimation based on the image recognition result stored in the storage module 60.

The estimation apparatus 10 uploads information about the vehicle, such as a current position, a scheduled driving course, differential information, a recognition result, etc., to the center 70. The estimation apparatus 10 downloads and receives information about a predetermined estimation area, such as attractor information, time gate information, Web information, etc., from the center 70.

Figure 2:
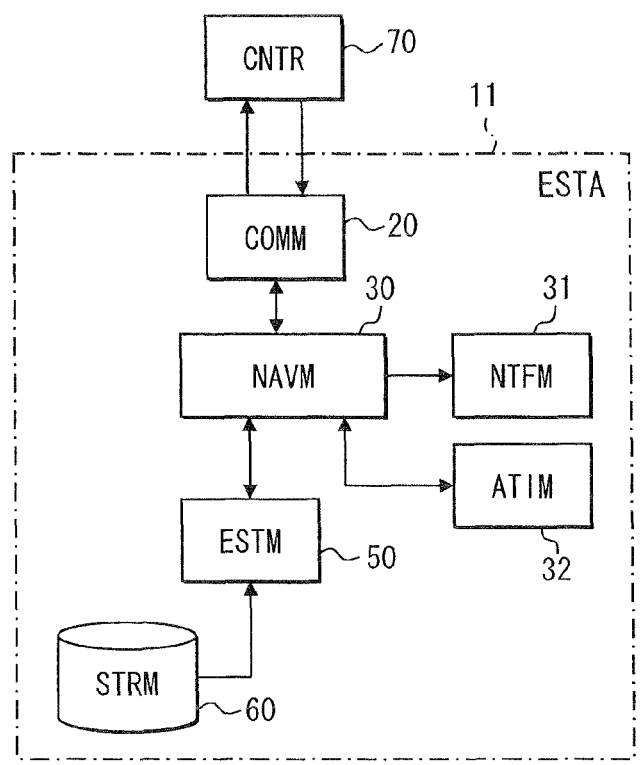
FIG. 2 is a block diagram showing a vehicle mountable estimation apparatus according to a second embodiment of the present invention.

FIG. 2 is a block diagram showing a vehicle mountable estimation apparatus 11 according to the type 2. The same or similar components, which were already described in the estimation apparatus 10, are denoted by the same reference numbers. The estimation apparatus 11 is mainly equipped with the data communication module 20, the navigation module 30, the estimating module 50, and the storage module 60. Difference from the estimating apparatus 10 is that the estimating apparatus 11 does not have the recognition module 40 and some accompanying components. Since the remaining arrangements are the same as the estimating apparatus 10, descriptions for those arrangements are omitted.

The estimation apparatus 11 uploads information about the vehicle, such as a current position, a scheduled driving course, etc., to the center 70. The estimation apparatus 11 downloads and receives information about a predetermined estimation area, such as attractor information, time gate information, Web information, etc., from the center 70.

Figure 3:
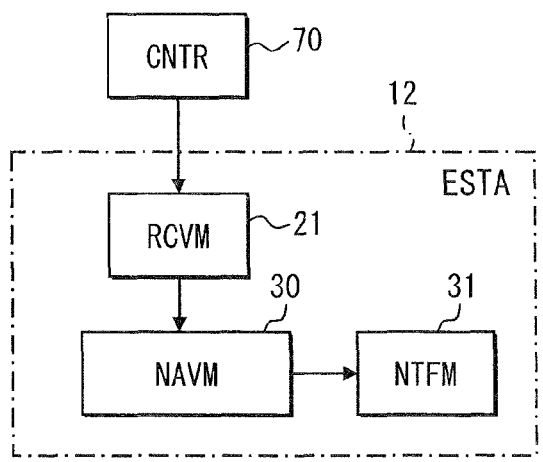
FIG. 3 is a block diagram showing a vehicle mountable estimation apparatus according to a third embodiment of the present invention.

FIG. 3 is a block diagram showing a vehicle mountable estimation apparatus 12 according to the type 3. Components that are the same as the estimation apparatus 10 and 11 are indicated by the same reference numbers. The estimation apparatus 12 includes a receiver module (RCVM) 21, a navigation module 30, and a notifying module 31. In this case, since the apparatus does not have even the estimating module 50, it only performs receiving operation from the center 70. Specifically, the apparatus 12 receives estimated information, such as a location, an estimated frequency showing the appearance frequency of pedestrians from the center 70 and notifies it to the user in the vehicle.

6. Configuration of Center

Figure 4:
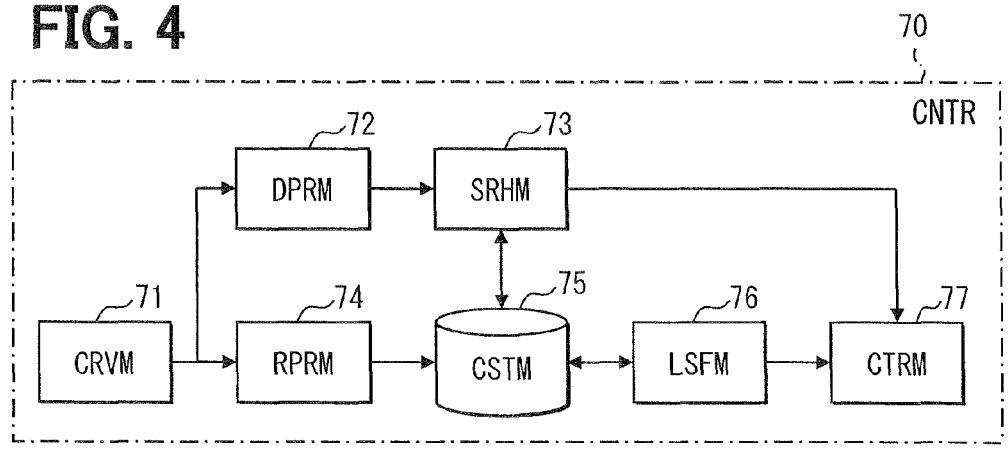
FIG. 4 is a block diagram showing a configuration of a center.

FIG. 4 shows a block diagram of the center 70. The center 70 includes a center receiver module (CRVM) 71, a demand processing module (DPRM) 72, a search module (SRHM) 73, a result processing module (RPRM) 74, a center storage module (CSTM) 75, a large-scale forecasting module (LSFM) 76, and a center transmitter module (CTRM) 77.

The center receiver module 71 is a module for receiving the information transmitted from the estimation apparatus 10 or 11. In response to a request from the estimation apparatus 10 or 11 to transmit information to the estimation apparatus 10 or 11, the demand processing module 72 commands the search module 73 to perform search processing about the information requested.

The search module 73 is a module for searching the data memorized in the center storage module 75. Data of search result by the search module 73 is memorized by the center storage module 75. Data of search result is also sent out to the center transmitter module 77, and is transmitted to the estimation apparatus 10 or 11.

In a case that information, such as an image recognition result, is uploaded from the estimation apparatus 10, the result processing module 74 stores and memorizes the uploaded data to the center storage module 75 in a predetermined format. In detail, the result processing module 74 arranges a database on a space-time basis by receiving information including a reliability degree about a pedestrian appearance frequency from the estimation apparatus 10 and 11, and associates them with geographic information.

The center storage module 75 may be provided by a data storage medium, such as a semiconductor memory device and a magnetic disc device. The large-scale forecasting module 76 uses the space-time database built in the center storage module 75, and performs large-scale estimating processing about an appearance frequency of pedestrians. The result of processing in the large-scale forecasting module 76 is stored in the center storage module 75 and is sent to the center transmitter module 77 to be transmitted to the estimation apparatus 10 or 11.

The center transmitter module 77 is a module for distributing information to the estimation apparatus 10, 11, or 12. Although, in the above description, the information transmission from the estimation apparatus 10 or 11 to the center 70 was mainly explained, information transmission from wireless-communication terminals or fixed point observation infrastructures to the center 70 may be also performed. In this case, the wireless-communication terminals may include a mobile phone and a PC. The fixed point observation infrastructures may include a camera mounted on a traffic crossing.

Explanation in detail is continued below, by mainly reviewing the type 1, which includes the estimation apparatus 10 including both the recognition module 40 and the estimating module 50.

7. Forecast Processing

Figure 5:
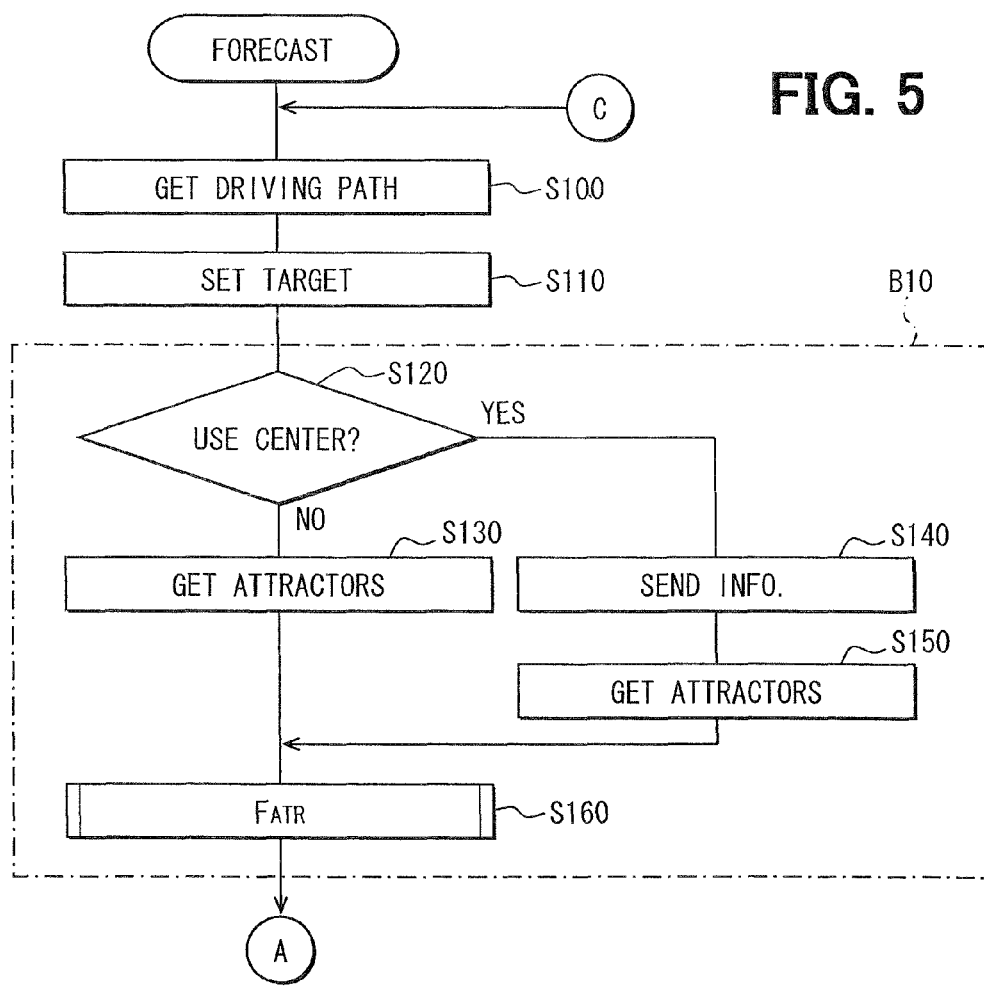
FIG. 5 a flow chart showing a part of forecast processing.
Figure 6:
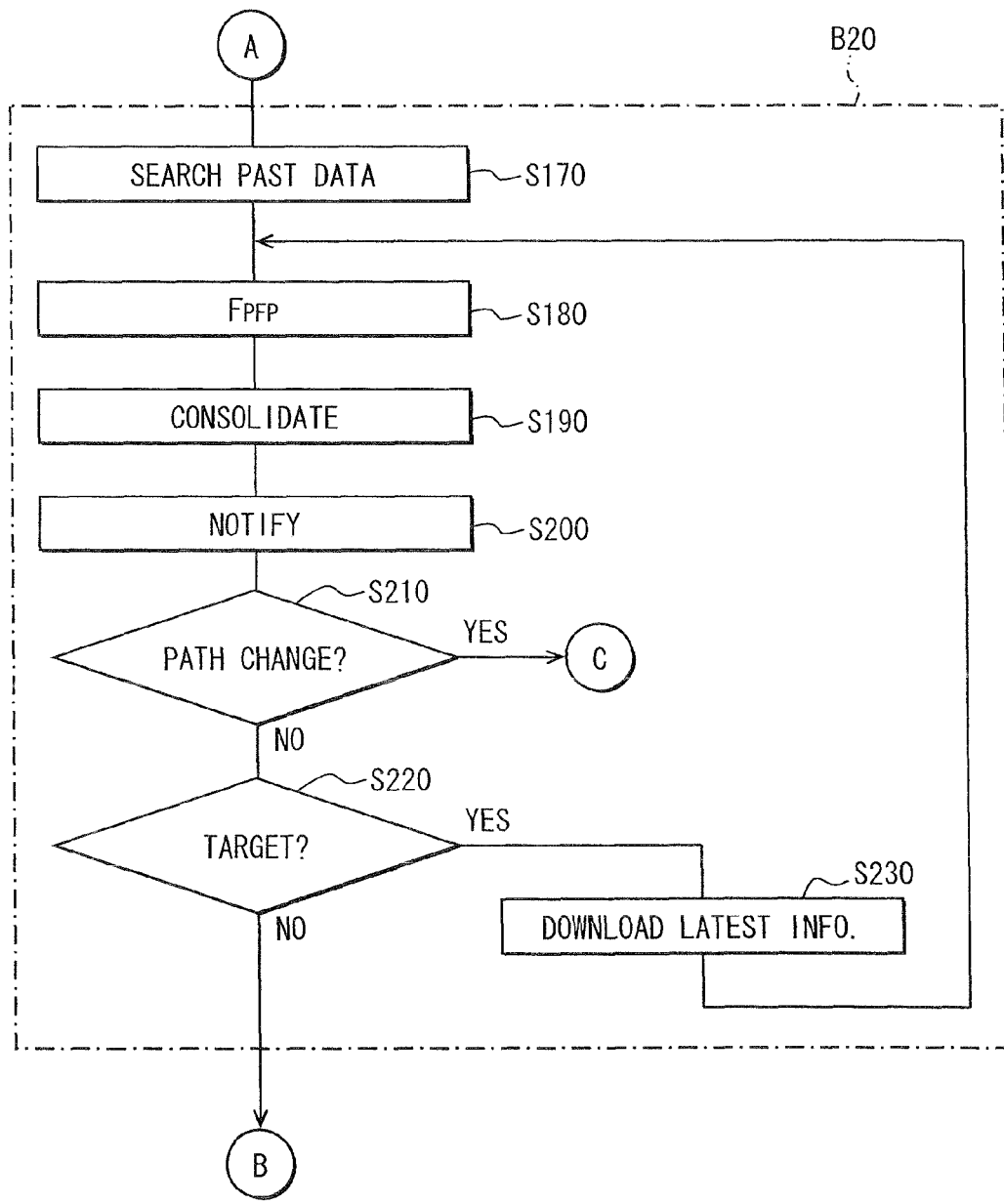
FIG. 6 a flow chart showing a part of forecast processing.
Figure 7:
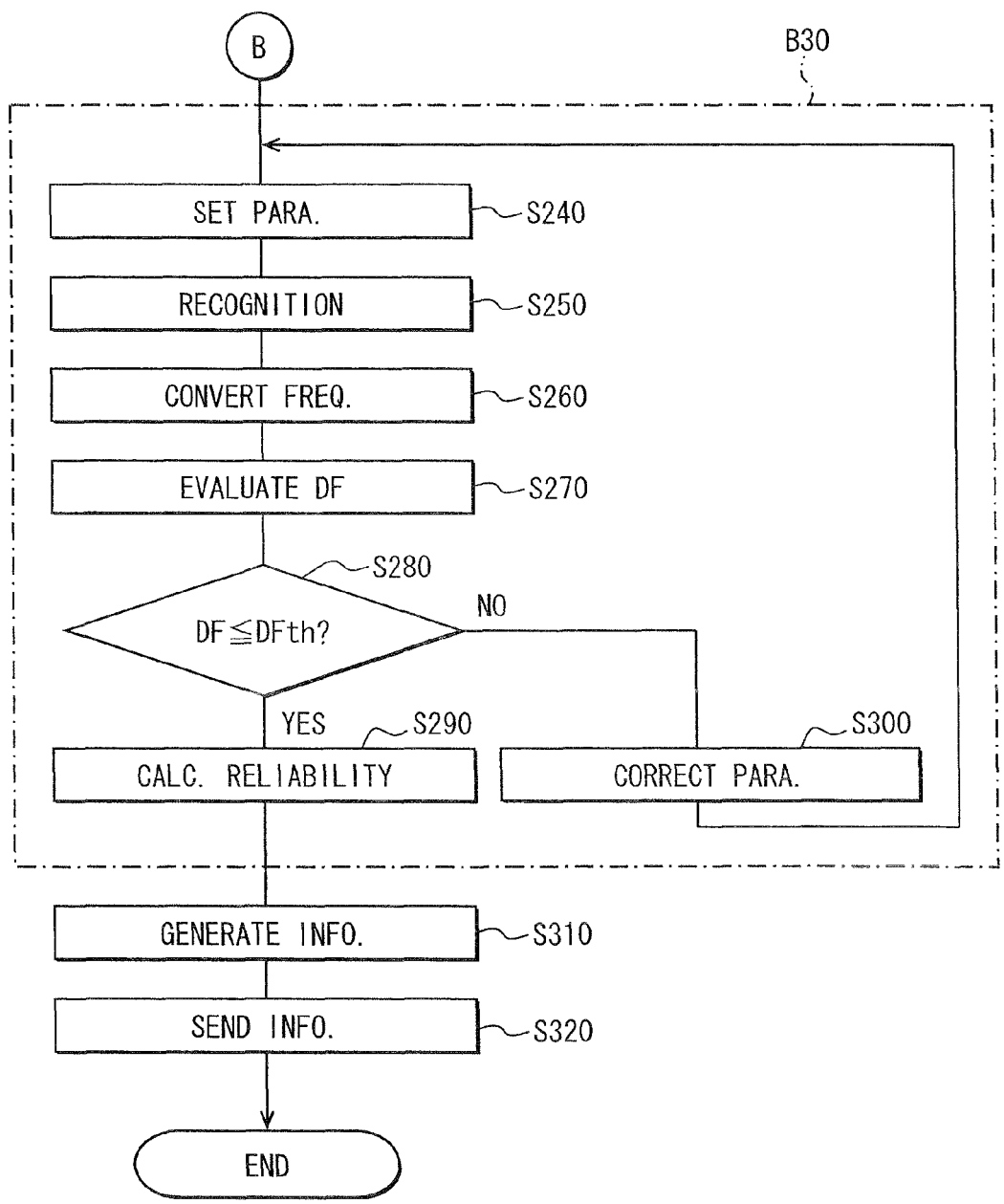
FIG. 7 a flow chart showing a part of forecast processing.

FIGS. 5, 6, and 7 are flow charts which show the forecast processing performed by the estimation apparatus 10. The forecast processing may be roughly divided into "Processing About $F_{ATR}$" shown by B10 in FIG. 5, "Processing About $F_{PFP}$" shown by B20 in FIG. 6, and "Processing to Improve Recognition Module 40" shown by B30 in FIG. 7. First, the entire flow is explained briefly, then, each one of these blocks B10-B30 are explained in detail.

7-1. Flow of Forecast Processing

In S100, the apparatus acquires a scheduled driving path prepared for a navigation service purpose. This processing is performed by the navigation module 30. The apparatus acquires the scheduled driving path set up by the user.

In S110, the apparatus sets a predetermined estimation area. This processing may be performed by the navigation module 30 by requesting the user to input information for setting the predetermined estimation area.

In B10, the apparatus calculates $F_{ATR}$. $F_{ATR}$ is an estimated appearance frequency which is estimated based on a plurality of influence of attractors, as mentioned above. In B20, the apparatus calculates $F_{PFP}$ (S180), consolidates $F_{PFP}$ with $F_{ATR}$ calculated in B10, then, calculates and notifies the pedestrian appearance frequency in the predetermined estimation area (S200).

Referring to FIG. 7, in B30, the apparatus performs processing for improving performance of the recognition module 40. In S310, the apparatus generates upload information from an image recognition result. This processing is realized as a function of the information generating module 46 in FIG. 1. In S320, the apparatus transmits the upload information from the vehicle to the center 70.

7-2. Processing about $F_{ATR}$

As shown in B10 in FIG. 5, in S120, it is determined whether the center 70 is used or not. When the user does not want to use the center 70 or the center 70 is not in service (S120: NO), the routine proceeds to S130. On the other hand, when it is expected to use the center 70 (S120: YES), the routine proceeds to S140.

In S130, the apparatus acquires attractor information 32 which is provided by the navigation module 30. Then, the routine proceeds to S160. In S140, the apparatus sends information, such as a present location and a scheduled driving path, to the center 70, and requests to send back attractor information. In response to the request, the center 70 sends the attractor information back. So, in S150, the apparatus on the vehicle receives the attractor information from the center 70. Then, the routine proceeds to S160.

In S160, it is performed to calculate the matrix $F_{ATR}$.

Figure 8:
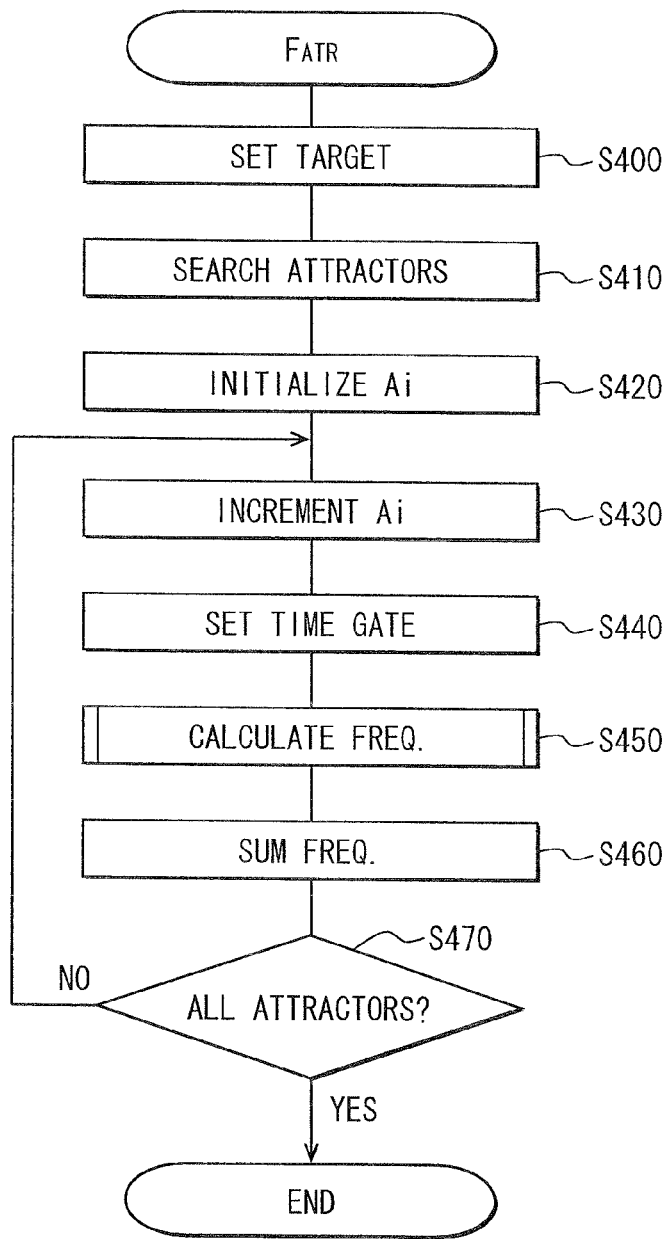
FIG. 8 is a flow chart which shows $F_{ATR}$ calculation processing.

7-2-1. Calculation of $F_{ATR}$ $F_{ATR}$ calculation processing is explained based on the flowchart of FIG. 8.

Figure 10:
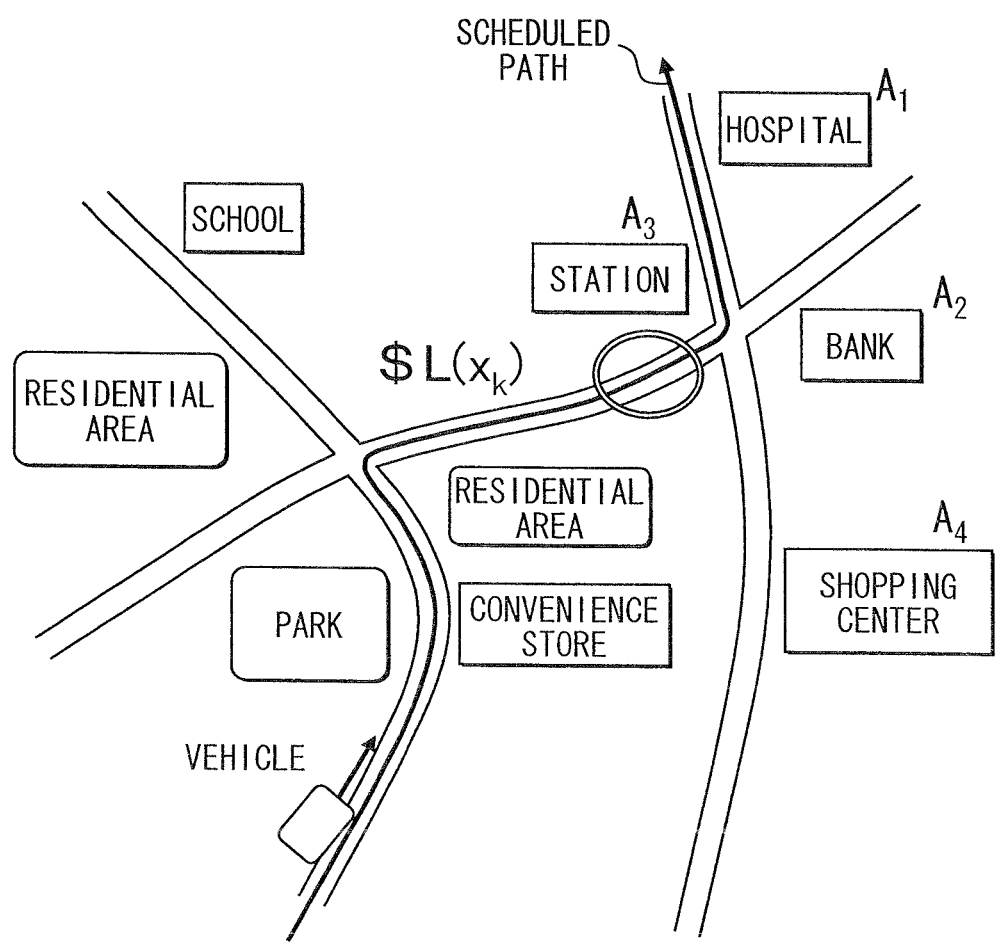
FIG. 10 is a diagram showing a map which indicates attractors listed up.

In the first step S400, the apparatus sets at least one link as a target link for estimation. This processing sets a link $L(x_k)$ as a target link. The link $L(x_k)$ is a connecting road between terminal points, such as crossing, and contains a place "$x_k$" on the scheduled driving path. The target link may be also referred to as the predetermined estimation area or a target. In S410, the apparatus searches attractors and makes a list of attractors. This processing looks for the attractors existing around the predetermined estimation area $L(x_k)$, and makes a list of attractors by assigning the number of i=1, . . . , $I_k$. For example, as shown in FIG. 10, attractors, such as a hospital "A1", a bank "A2", a subway station "A3", and a shopping center "A4", are listed up.

In S420, the number i for the attractors is initialized to "0". In S430, the number i for the attractors is incremented. Thereby, the apparatus begins processing from the attractor "$A_1$".

In S440, the apparatus sets a time gate. This processing sets up the time gate $TG(A_i)$ based on information about an attractor "$A_i$", such as an average accommodation number, business hours, etc. In S450, the estimated frequency resulting from the attractor, which is an objective of processing, is calculated. This processing calculates estimated frequency $F_{ATR}(x_k, s_l|A_i)$ on the predetermined area $L(x_k)$ resulting from the attractor "$A_i$".

In S460, the estimated frequency calculated in S450 is summed. Specifically, the apparatus calculates $F_{ATR}(x_k, s_l) = F_{ATR}(x_k, s_l) + F_{ATR}(x_k, s_l|A_i)$. In S470, it is determined that whether processing for all the attractors were completed. If it is determined that processing for all the attractors were completed (S470: YES), $F_{ATR}$ calculation processing is finished. On the other hand, while there is an attractor which is not processed (S470: NO), the processing from S430 are repeated.

Figure 9:
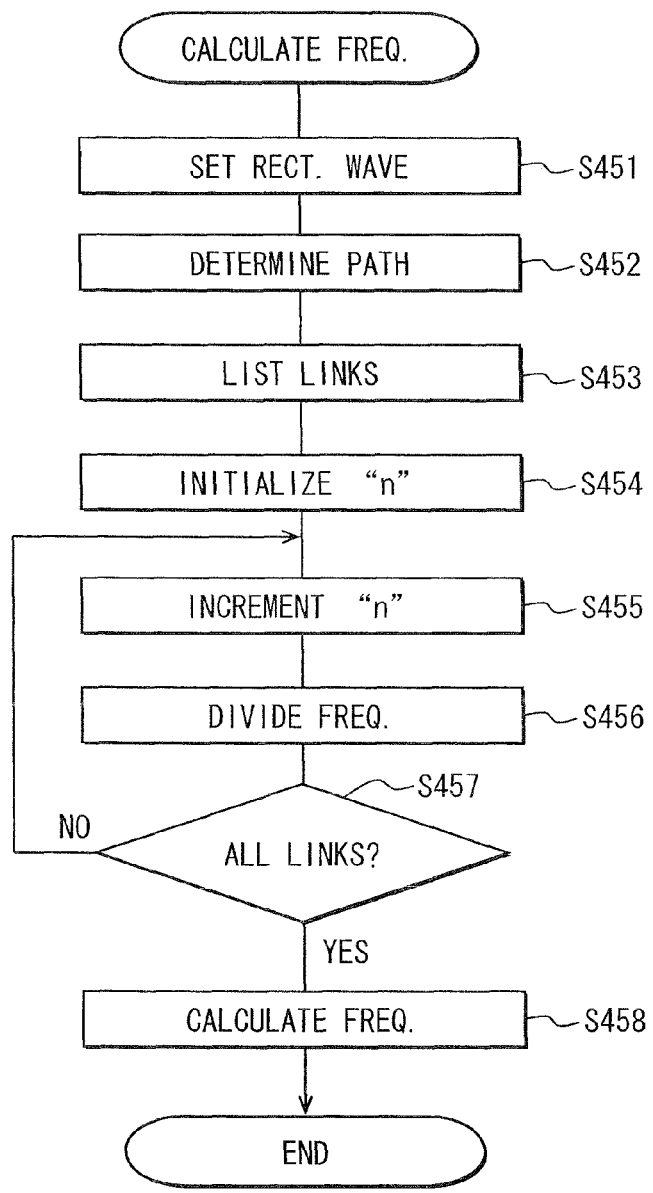
FIG. 9 a flow chart showing a calculating processing for an estimated frequency for an attractors.

Referring to FIG. 9, the details of the processing of S450 mentioned above are explained. In S451, a rectangular wave is set. This processing sets a rectangular wave $\Gamma_{TGi}$ (Gamma-TGi) which has a height corresponding to an average accommodation number $N_0(i)$.

In S452, the apparatus determines a path. This processing determines a driving path $L_N$ from an attractor "$A_i$" to the predetermined estimation area. In S453, the apparatus lists up links. This processing lists us links $Ln$ between the n-th branch $B_n$ and (n+1)-th branch $B_{n+1}$. Branches may be corresponding to crossings on a map. Here, n=1, . . . , N−1.

In S454, link number "n" is initialized to "0". In S455, link number "n" is incremented. Thereby, the apparatus begins processing from the link $L_1$.

In S456, the apparatus divides an appearance frequency according to branches. This processing divides an appearance frequency $Nn-1$ in the link $L_{n-1}$ into $J_n$ parts with respect to the branches $B_n$. In this processing, if there is no specific information or instruction, the apparatus equally divides the appearance frequency into $J_n$ parts.

In S457, it is determined whether all the links were processed. When it is determined that all the links were processed (S457: YES), the routine proceeds to S458. On the other hand, while there is a link which is not processed (S457: NO), the processing from S455 is repeated.

In S458, a value of estimated frequency is calculated. This processing calculates the estimated frequency as an estimated frequency of an object based on an existence time of an object in a link $L_N$, a time range for estimation, and a passing time of the vehicle. The passing time is a period of time which the vehicle needs to pass through the predetermined area.

The above is "Processing About $F_{ATR}$" shown by B10 in FIG. 5. Here, in order to make an understanding of this processing easy, an example is explained. In this example, first attractor information is explained in detail, then, a technique using a time gate is explained.

7-2-2. Information about Attractor

An attractor is an element which can attract people and drives those people to come to there and leave from there. The attractor may include a school, a store, a shopping center, a hospital, a station, a theme park, a hall, a baseball stadium, a bus stop, a terminal, a park, etc. If there is sufficient geographic information, such as map information, Web information, etc., about an attractor, it is possible to perform a primary estimation about a pedestrian appearance frequency around the attractor.

Therefore, in this embodiment, the following estimating technique using the following information is employed.

(1) Service time of an attractor (a commuting time period to-and-from-school will be used for a school).

(2) Surrounding map information on an attractor (especially a position and access information), and road information.

(3) Whether the attractor and the access information about the attractor tend to be affected by the weather (a rain, windy, or snow) or not?

(4) Movement degree of those who come to and leave from the attractor (a pedestrian, a bike).

7-2-3. Classification of Attractor

The attractors can be classified by the following two kinds of categories.

(1) Average Utility Time

A1 class: 4 hours or more (for example, a school, an office building, a station, etc.)

A2 class: 2 hours-4 hours (for example, a hospital, a shopping center, a movie theater, a sport facility, etc.)

A3 class: 1 hour-2 hours (for example, a bank, a store, a restaurant, etc.)

A4 class: Less than 1 hour (for example, a convenience store, a post office, etc.)

(2) Whether it is a Means (Transit Place) or a Destination?

B1 class: a destination of which available time is almost fixed (for example, a school, an office building, etc.)

B2 class: a destination of which available time is not fixed (for example, a hospital, a shopping center, a movie theater, a sport facility, a convenience store, a post office, a restaurant, a store, a bank, etc.)

B3 class: a transit place of which available time is not fixed (for example, a station, a bus stop, etc.)

Available time of an attractor may include a highly intensive time range at which many people come in and leave the attractor. The highly intensive time range may be called an active time for the attractor. The active time may be referred to as a time gate if the active time is defined or authorized by the attractor side.

7-2-4. Time Gate

The time gate may be referred to as just a TG. A TG accompanied to the attractor can be expressed by a rectangular wave having a height of "1". The rectangular wave is defined as a fundamental wave form. In addition, a wave form which has a height corresponding to a frequency of pedestrians in an attractor may be defined. This wave form may be referred to as a probability wave form of an appearance frequency of pedestrians relating to the attractor. This processing provides a time gate setting module which sets up a time gate. The time gate shows an existence probability of an object in an attractor. The existence probability is affected by a time factor.

In this embodiment, for simplification, the rectangular wave $\Gamma_{\pi i}$ (Gamma-pi-i) which has height corresponding to an average accommodation number $N_0(i)$ is defined and considered. Then, if the predetermined estimation area (target) "$x_k$" is within 1 km radius from an attractor, the rectangular wave $\Gamma_{\pi i}$ (Gamma-pi-i) is deformed in accordance with a traveling time in the section and an observed time range.

A traveling time will is decided by the length of the target section and a movement degree. When a movement degree is 4 km/h and a section is in 200 m length, a traveling time will be 3 minutes. An observed time range is a time rage where estimation is performed and corresponds to a time resolution for estimation. For example, an observed time range may be defined per 30 minutes. For example, an observed time range may be set from 8:00 AM to 8:30 AM. In detail, when the vehicle passes through a 200 m long section by a speed of 40 km/h, an observed time range may be a period of 18 seconds.

A rectangular wave $\Gamma_{\pi i}$ (Gamma-pi-i) for an attractor propagates through a path between a predetermined estimation area "$x_k$" and an attractor "$A_i$". A rectangular wave $\Gamma_{\pi i}$ (Gamma-pi-i) for an attractor propagates toward the past along the time. The symbol "$A_i$" indicates the i-th attractor. This is referred to as a "reverse propagation". Height of a rectangular wave $\Gamma_{\pi i}$ (Gamma-pi-i) is decreased according to the number of branches in the scheduled driving path. This is because the number of pedestrians relating to an attractor would be decreased branch by branch. Here, it is assumed that total of a pedestrian appearance frequency on a path before a branch and a pedestrian appearance frequency on paths after a branch is equal. Moreover, for simplification, it is assumed that the branch can be expressed in a tree structure model.

Then, a distance $L(x_k/A_i)$, the number of branches, and a ratio of branch may affect a character of a forecast processing. The ratio of branch is related because it is not always true that each path after a branch does have equal number of pedestrians. The character of a forecast processing is a height of rectangular wave $\Gamma_{\pi i}$ (Gamma-pi-i) which was propagated in a reverse direction to a predetermined estimation area, i.e., a probabilistic pedestrian appearance frequency.

Regarding a question about what kind of branch arises on a scheduled driving path on a map, and a question about what length of path arises on each route, since several kinds of graph algorithms are already available in a car-navigation system etc., the details are not described here.

For example, it is assumed that a commuting time range to go to a certain school is from 7:00 AM to 8:00 AM. This time range can be used as TG. The TG will propagate toward the past over a range where pedestrians can move in about 30 minutes before 8:00 AM. In this case, a peak of an appearance of pedestrians likely observed within the range. That is, there may be a case where an appearance frequency that is different from the appearance frequency averaged in the time basis is generated. When the number of sampling data is remarkably small, it is possible to improve a certainty degree of a forecast by modeling characteristics of generating such a peak.

The following elements may drive the propagation of TG.
(1) A place where TG is defined (attractor)
(2) A category of an object which is going to pass TG (a child, a bike, etc.)
(3) A path between a place $x(O_i)$ where an object "$O_j$" is assumed to be or pass there and a place $x(A_i)$ where an attractor "$A_i$" exists.
(4) A movement degree according to the kind of object (a pedestrian, a bike, others)

For example, it is assumed that a bike has three times higher movement degree than a pedestrian, an appearance frequency of a bike for a predetermined time range in the predetermined estimation area (target) would be one third (⅓) of an appearance frequency of a pedestrian.

7-2-5. Influence of Attractors

Next, an influence of a plurality of attractors is considered. It is assumed that there are a plurality of attractors $A_1, \text{---}, A_i, \ldots A_{ik}$ along the neighborhood of the scheduled place "$x_k$". Rectangular waves $\Gamma_{TGi}$ (Gamma-TG-i) are driven by "$A_i$" and shows propagation to a route to the attractor "$A_i$" in a time reversing manner. As a result, an appearance frequency of people on the predetermined estimation area may be estimated as a compounded waveform of the rectangular waves $\Gamma_{TGi}$ (Gamma-TG-i) propagated in the reverse direction.

Figure 11:
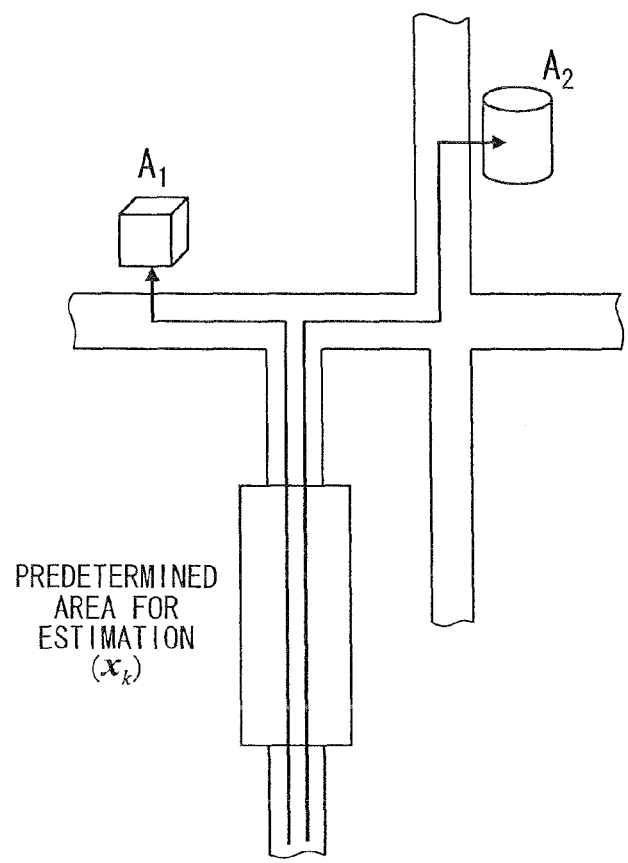
FIG. 11 is a diagram showing consolidating processing of an appearance frequency caused by the a plurality of attractors.
Figure 12:
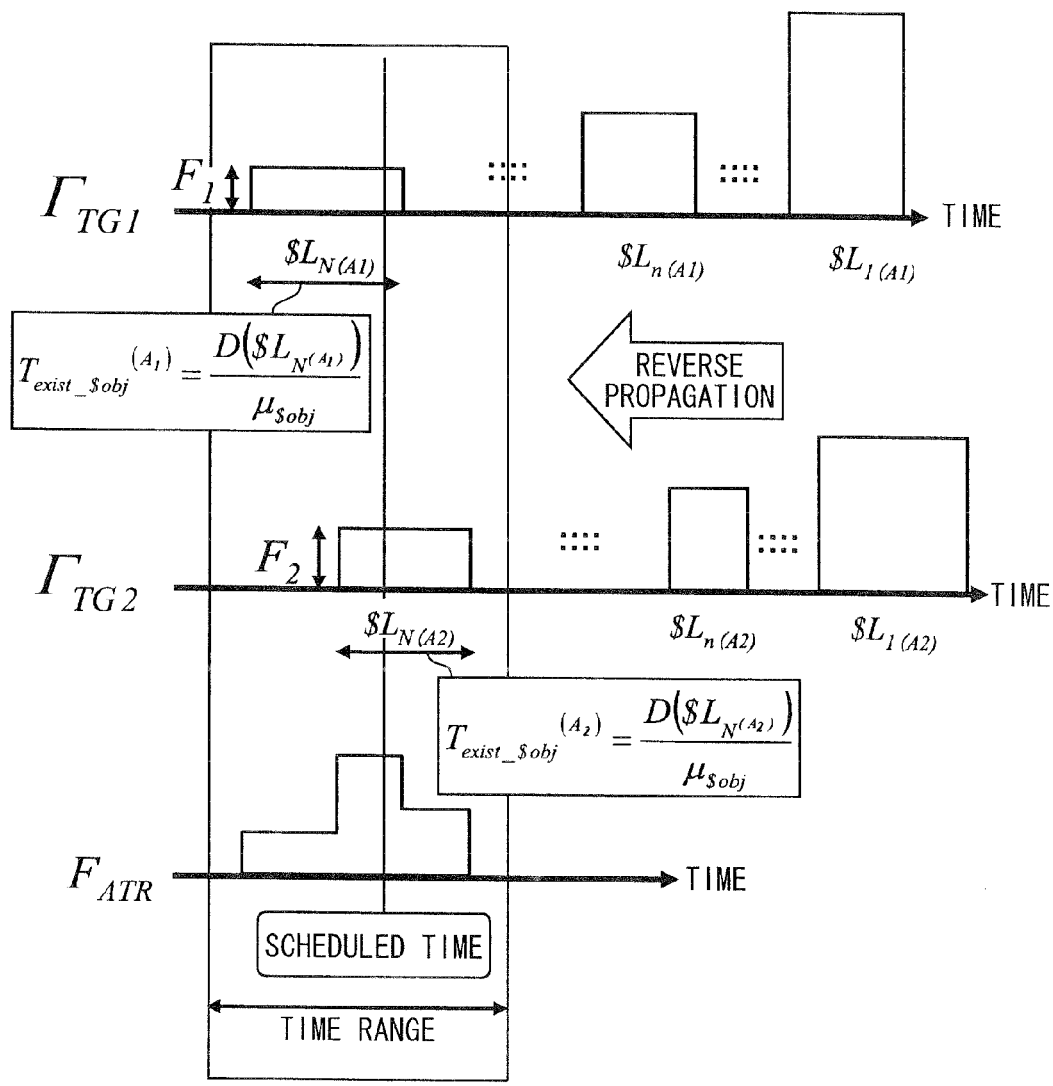
FIG. 12 is a diagram showing consolidating processing of an appearance frequency caused by the a plurality of attractors.

For example, FIG. 11 shows a case where two attractors "$A_1$" and "$A_2$" exist. In this case, TGs are backwardly propagated from each one of attractors to the predetermined estimation area. As a result, an appearance frequency "$F_1$" driven by "$A_1$" and an appearance frequency "$F_2$" driven by "$A_2$" appear on the predetermined area (target area) in an overlapping manner. The sum of "$F_1$" and "$F_2$" may be a result of estimation of an appearance frequency in the target area. FIG. 12 shows compounding or consolidating process of the rectangular waves $\Gamma_{TG1}$ (Gamma-TG-1) and $\Gamma_{TG2}$ (Gamma-TG-2)

This can be generalized, and may be expressed by the following formula.

$$F_{ATR}(x_k, s_l) = \sum_{i=1}^{l_k} F_{ATR}(x_k, s_l | A_i) \quad \text{(FORMULA 6)}$$

7-2-5. Movement Degree

The movement degree of human in this embodiment may be roughly divided into the following two categories.
(1) Movement degree of pedestrians: $\mu_P$ (Mu-P)
(2) Movement degree of bike: $\mu_B$ (Mu-B)

Although the pedestrian have small values for a moving range and a movement degree compared with vehicles, the pedestrians have high flexibility for movement. That is, the pedestrians are free for overtaking, and also free for course changing. In addition, the pedestrians are free from others, therefore, have no dependency among others. In contrast, a vehicle usually has a dependency among other vehicles on the traffic.

Such a movement degree may be obtained by a calculation in a purely statistical manner, when no information (foresight information) relevant to an attractor "$A_i$" is provided. On the other hand, it is possible to give an offset to few measurement results, when there is information (foresight information) relevant to an attractor "$A_i$".

7-2-6. Estimation of Encounter Time

A distance and a route from $TG(A_i)$ to a target section for estimation may be acquired based on the map information and Web information provided by the navigation module 30.

Therefore, it is possible to estimate an existing time of a person in the target, i.e., a traveling time along a road, by propagating $TG(A_i)$ in a reverse direction along the route. This may help an estimation of an appearance frequency of pedestrians which may encounter along the scheduled driving path and in the target.

At this time, the estimation may be performed under the following restrictions.

(R1) Pedestrians only move about 1 km by walk to an attractor.

(R2) Bike only move about 3 km in maximum.

(R3) Both pedestrians and bikes tend to be affected by the weather on an outdoor road.

(R4) Movement degree of pedestrians is one third (⅓) of that of bikes.

7-2-7. Example of Reverse Propagation

Figure 13:
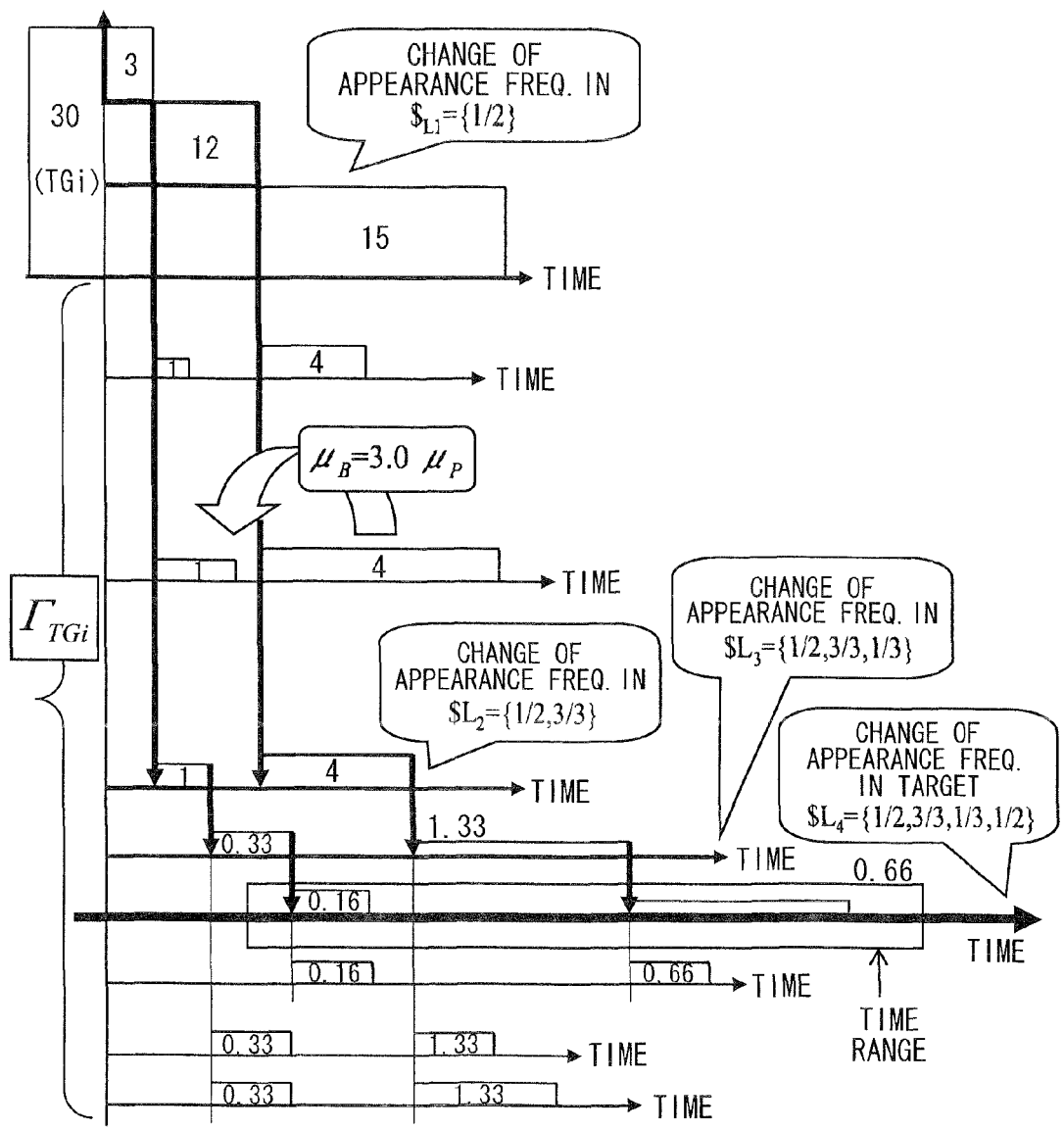
FIG. 13 is a timing chart showing an example of calculation of an appearance frequency.
Figure 14:
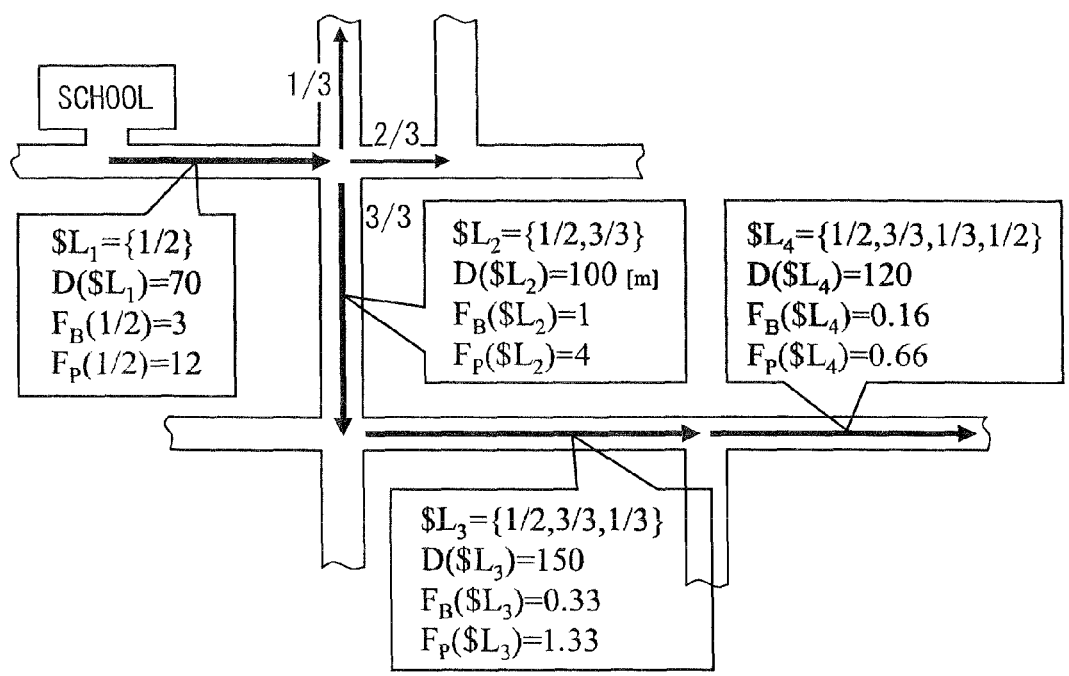
FIG. 14 is a diagram showing an example of calculation of an appearance frequency.

Referring to FIG. 13 and FIG. 14, an example of reverse propagation of TG is described. Here, it is assumed that 15 students start a school gate simultaneously and go home among 30 students by using restrictions of the above (R4). Among 15 students, 12 students go home by walk and 3 students go home by bike. It is also assumed that the number of students is equally divided at a branch set on a crossing. The time chart in FIG. 13 shows transition of propagation of a rectangular wave $\Gamma_{TGi}$ (Gamma-TGi).

In FIG. 14, "$F_B$" is the appearance frequency of a bike, and "$F_P$" is the appearance frequency of pedestrians. The expression $\$L_4 = \{1/2, 3/3, 1/3, 1/2\}$ describes and shows branch of the path from an attractor to the predetermined estimation area. In detail, as shown in FIG. 14, in a case of leaving from a gate of a school, a direction indicated by a right arrow is shown by "1/2", a direction indicated by a left arrow is shown by "2/2". Similarly, since a crossing of road on the next has three roads branched from the road from the school, those branched roads are expressed in "1/3", "2/3", and "3/3". Generally, as shown below, the link of the predetermined estimation area seen from the attractor can be expressed.

$$\$L_N = \{j_1/J_1, \ldots, j_n/J_n, \ldots, j_N/J_N\} \quad \text{(FORMULA 7)}$$

In the above formula, "$J_n$" is the number of roads at the n-th branch point, "$j_n$" means a selection of the $j_n$-th road in the branch poiont "$J_n$". For example, "$j_n$" shows the $j_n$-th road in a right-handed rotation from the most left side one viewing the branch point. Based on this notation, $F_{\$obj}(\$L_n)$ expresses the appearance frequency of an object $obj in a link from the n-th branch to the (n+1)-th branch.

In the example of FIG. 14, $obj=B shows an appearance frequency of a bike, and $obj=P shows a pedestrian appearance frequency. Similarly, $D(\$L_n)$ expresses a length of a link. Under such a notation, estimated values of the appearance frequency are shown on the map of FIG. 14.

In the case of FIG. 14, it is assumed that 15 students are started leaving a school. However, in an actual case, the time at which each student comes out of a school gate thought to be varied. The model can be simplified based on the above analysis of the behavior of students (customer of the attractor (school)). An average estimated appearance frequency in a predetermined estimation area may be calculated as a value provided by multiplying an estimated appearance frequency (height of the rectangular wave $\Gamma_{TGi}$ (Gamma-TGi)) by a time ratio of the targeted object, i.e., students. The time ratio is a ratio between an estimation target time "$T_{predict}$" shown by the time range in FIG. 13 and an existence time "$T_{exist}$" of each object in the predetermined estimation area (link). That is, it is shown by the following formula.

$$\bar{F} = \bar{F}_P + \bar{F}_B \quad \text{(FORMULA 8)}$$
$$\bar{F}_P = \lambda_P F_P = \frac{T_{exist\_P}}{T_{predict}} F_P$$
$$\bar{F}_B = \lambda_B F_B = \frac{T_{exist\_B}}{T_{predict}} F_B$$

In addition, by considering a passing time "$T_{exist\#C}$" of the vehicle through the predetermined area, the appearance frequency which is calculated by applying an observation rate "$\lambda c$" (Lambda-C) at the time of passing can be calculated by the following formula.

$$\tilde{F} = \lambda_C \bar{F} \quad \text{(FORMULA 9)}$$
$$\lambda_C = \frac{T_{exist\_C}}{T_{predict}}$$

Values of existence time of the objects, such as a pedestrian, a bike, the vehicle, can be calculated by the following formula based on a link length and a movement degree. In the formula, it is assumed that $obj=P, B, C.

$$T_{exit\_\$obj} = \frac{D(\$L_N)}{\mu_{\$obj}} \quad \text{(FORMULA 10)}$$

Next, it is assumed that the appearance frequency at the time of coming to a school can be estimated by using the same method as the appearance frequency at the time of leaving from a school. This estimation can be approximately performed by a model which is reversed the time-axis of the process at the time of leaving from a school mentioned above. That is, it can be thought that there may be variation of start time for coming to a school similar to the time for leaving from a school. It may be estimated that substantially the same appearance density may be observed by the time lag to an attractor. Here, since a direction of time is reversed, this model is referred to as a reverse propagation. Therefore, the above-mentioned model for an average estimated appearance frequency can be used as a primary approximate value also at the time of coming to a school.

7-2-8. Use of Web Information

A place of an attractor, a functioning time of an attractor, an activation time of an attractor, and "TG" of an attractor may be obtained via Web information. Moreover, the information about the weather and traffic congestion information may be available

7-2-9. Use of Navigation Information

The apparatus may receive information from the navigation module 30, including a present place, a direction of movement, existence or nonexistence of near facilities (attractor), and traffic congestion information.

7-3. Processing about FPFP

Next, referring to B20 in FIG. 6, "Processing About $F_{PFP}$" is explained. In S170, the apparatus searches data of an appearance frequency in the past. This processing provides a module for searching data of the appearance frequency in the past on the scheduled driving path stored in the storage module 60.

In S180, the apparatus calculates $F_{PFP}$. This processing provides a module for calculating $F_{PFP}$ as a result of having estimated an appearance frequency in the place "x" and at the status "s", based on search result of data of the past appearance frequency. The detailed calculation method is mentioned later.

In S190, estimated frequency $F_{ATR}$ and $F_{PFP}$ are compounded. This processing compounds and consolidates two variables, appearance frequency $F_{ATR}$ and $F_{PFP}$, by using the formula 4 mentioned above. In S200, the apparatus notifies the estimated frequency to a user of the vehicle. This processing is performed by the navigation module 30, and through the notifying module 31.

In S210, it is determined whether the vehicle changes a route from the scheduled driving path to the other path. This processing determines that whether the vehicle is driven to change paths so that the predetermined estimation area is avoided. If it is determined that a change for another path is made (S210: YES), the processing from S100 in FIG. 5 is repeated. On the other hand, if it is determined that the change for another path is not made (S210: NO), the routine proceeds to S220.

In S220, it is determined whether the vehicle is driven in the predetermined estimation area. If the vehicle is driven in the predetermined estimation area (S220:YES), the apparatus downloads the latest probe information from the center 70, and the processing from S180 is repeated. On the other hand, if the vehicle is not driven in the predetermined estimation area (S220: NO), the routine proceeds to S240 in FIG. 7.

7-3-1. Estimation Based on Statistics Data

Figure 15:
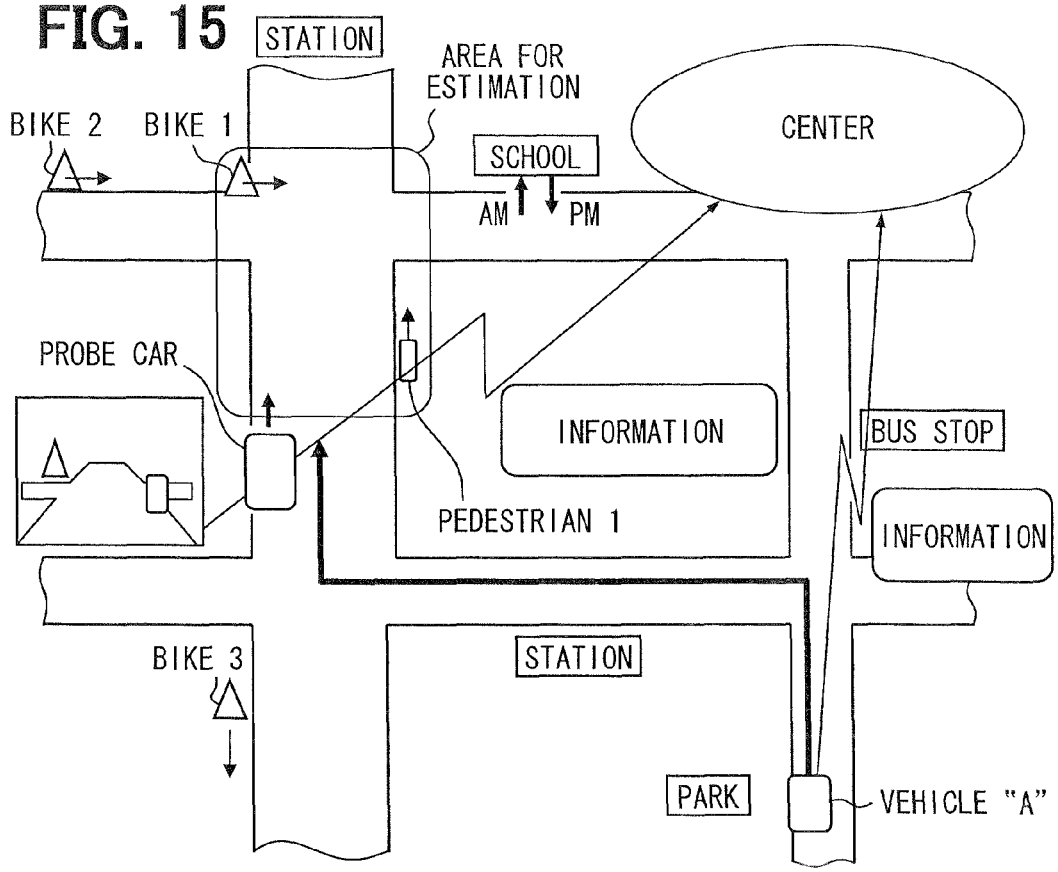
FIG. 15 is a diagram showing an example which uses the appearance frequency data in the past for estimation.

FIG. 15 shows an outline of processing when a pedestrian appearance frequency in a predetermined estimation area is presented in the vehicle "A" of the user. Here, the vehicle "A" which approaches to the predetermined estimation area (target) transmits information, which is necessary for estimation, to the center 70. Transmitted information may include a scheduled driving path, a predetermined estimation area, and projected time when the vehicle "A" reaches to the predetermined area. On the other hand, a vehicle, probe car, which drove through the predetermined area and captures an image in the predetermined area before the vehicle "A" reaches to the predetermined area (including the past before the vehicle "A" generates a request), uploads information about an image recognition result to the center 70. The probe car uploads information, such as a present position (location on a map), a scheduled driving path, differential information between an estimation and a true condition, and a recognition result. By taking those status into consideration, a pedestrian appearance frequency is presented to the user. The pedestrian appearance frequency is prepared in accordance with the status information, such as relationships with a plurality of attractors and time elapsed as the vehicle approaches to the target.

7-3-2. Example of Predetermined Area

Figure 16:
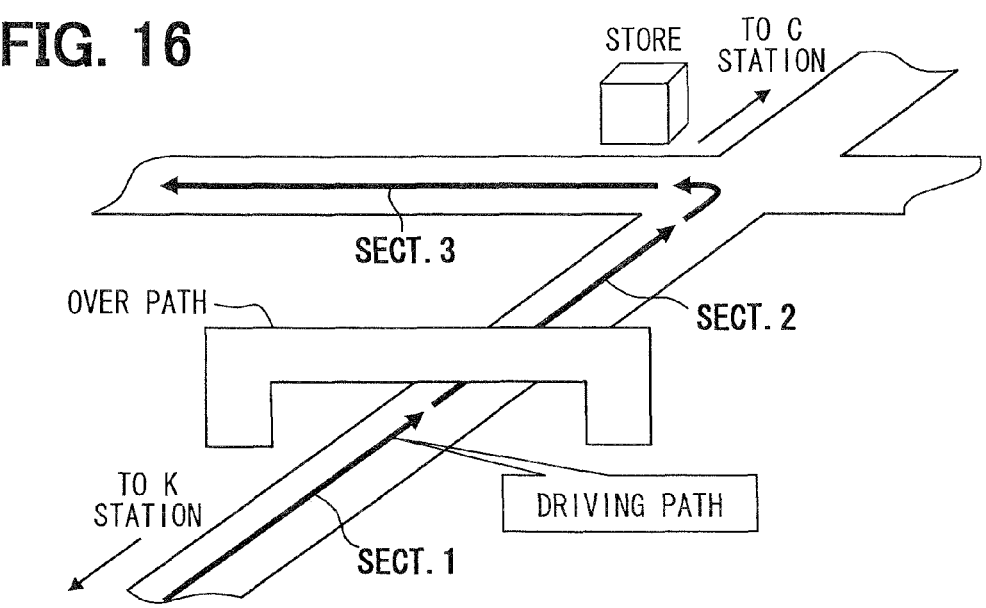
FIG. 16 is a diagram showing an example of predetermined estimation area.

FIG. 16 shows an example of the predetermined estimation area set in an actual experimental drive. In FIG. 16, it is shown that the vehicle having the estimating apparatus is driven from an area of the "K" station toward an area of the "C" station, is driven to pass through an over path, and is turned left at a crossing where a store is located on a corner. At this time, predetermined areas for estimation were set up as a section 1 until an over path, a section 2 until the store, and a section 3 after passing the store.

7-3-3. Definition of Feature Vector

Figure 17:
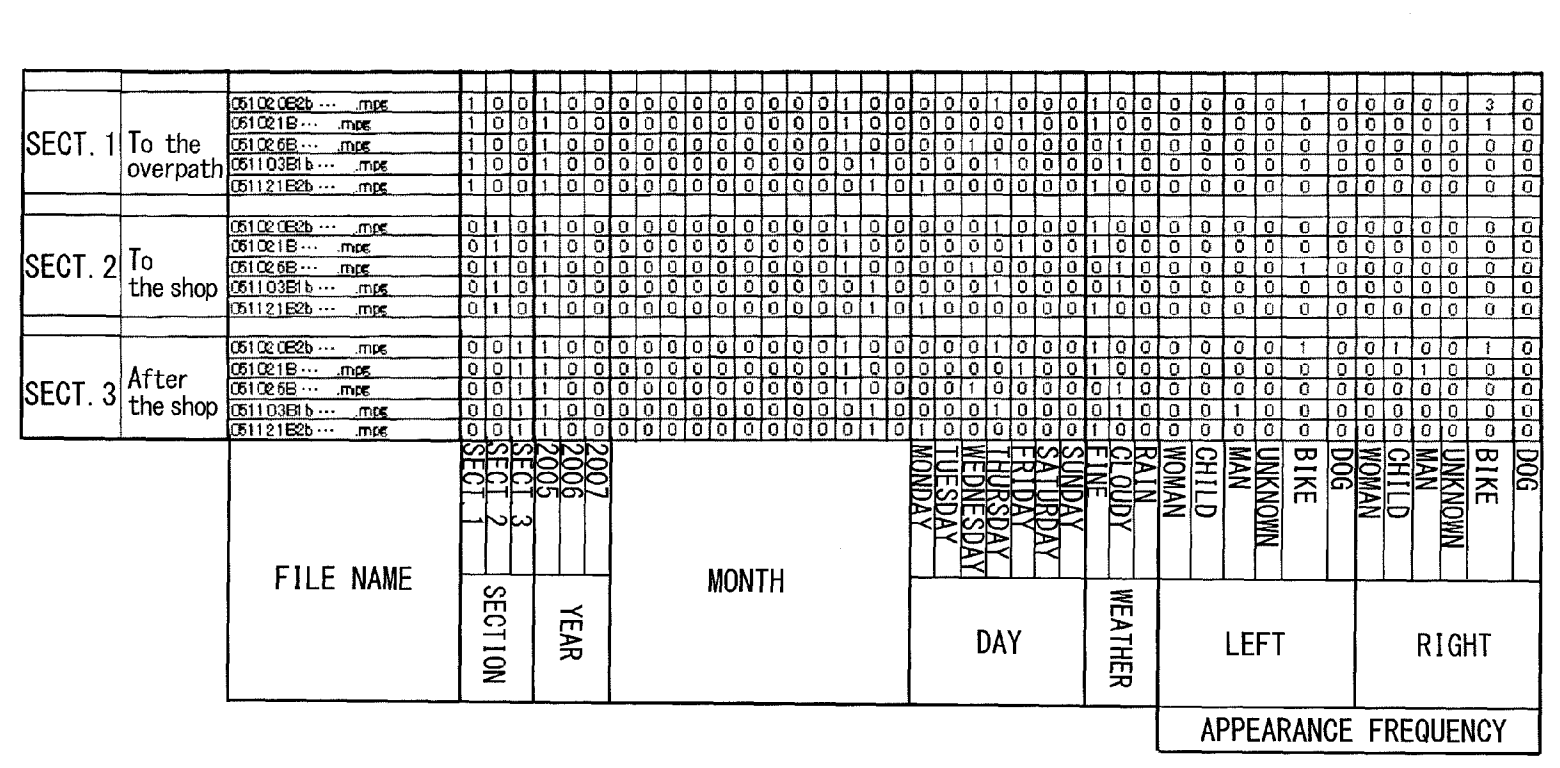

In detail, an estimation object that is an output of the estimating module 50 is expressed as a vector. FIG. 17 shows an example of a classification of objects to be estimated. The classification includes 12 kinds, such as a "man, woman, child, bike, unknown, dog" and a "right, left". As a result, a feature vector of a pedestrian appearance frequency, i.e., objective variables of estimation, observed from an on-vehicle camera is expressed by 12th dimension. The definition of this feature vector is used also in study of the estimating module 50 as it is.

However, it is difficult to attain a high recognition rate about the above listed complicated classifications with the present stand alone image recognition technology alone. In order to obtain leaning data for high accuracy of recognition, it is still necessary to depend on an off-line based advanced recognition processing, a compound processing of a plurality of sensors, or a correct answer obtaining method by a human. In FIG. 17, the correct answer (GT: Ground Truth) is obtained by a human.

Figure 18:
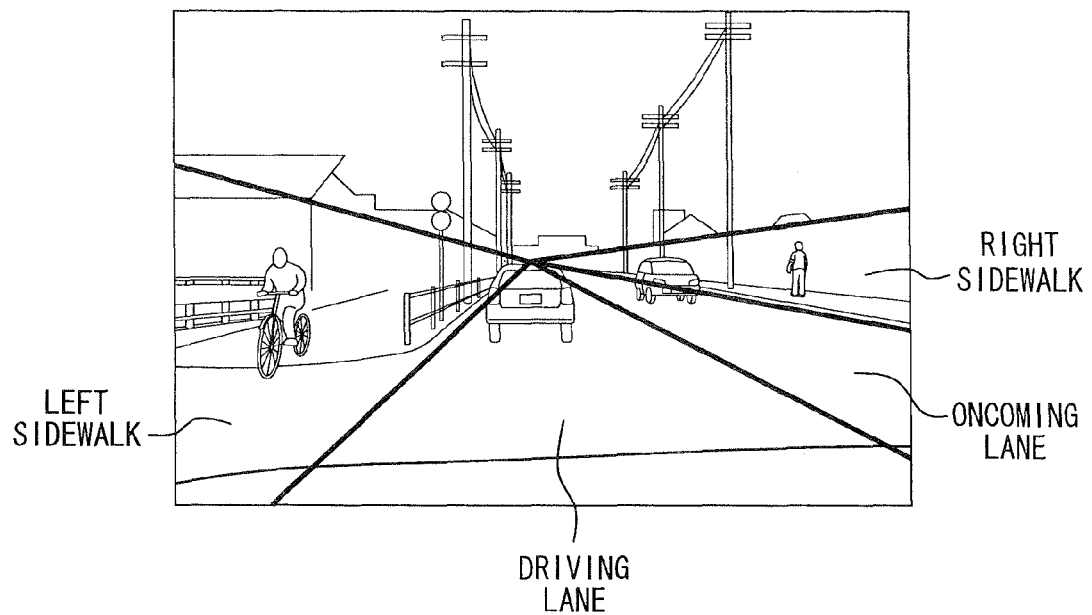
FIG. 18 is a diagram showing an example of partial areas included in feature information.

This embodiment sets a right area and a left area viewing from the vehicle as partial areas of the predetermined estimation area. Alternatively, the predetermined estimation area may be divided into smaller partial areas than the embodiment. For example, FIG. 18 shows a simplified image actually captured from a vehicle. In this example, image recognition is performed based on four partial areas, i.e., Left sidewalk, Driving lane, Oncoming lane, and Right sidewalk.

7-3-4. Definition of Status Information Vector

Status information is used as explaining variables, which explain the feature vectors when a feature vector occurs. The status information includes information about at least one of or all of a "place, day and time, weather" as shown in FIG. 17. Here, the place can be expressed by 3rd dimension vector space, in which each dimension corresponds to a section. The day and time can be expressed by 22nd dimension vector space including a "year, month, day of the week". The weather can be expressed by 3rd dimension vector space including a "fine, cloudy, rain".

Figure 19:
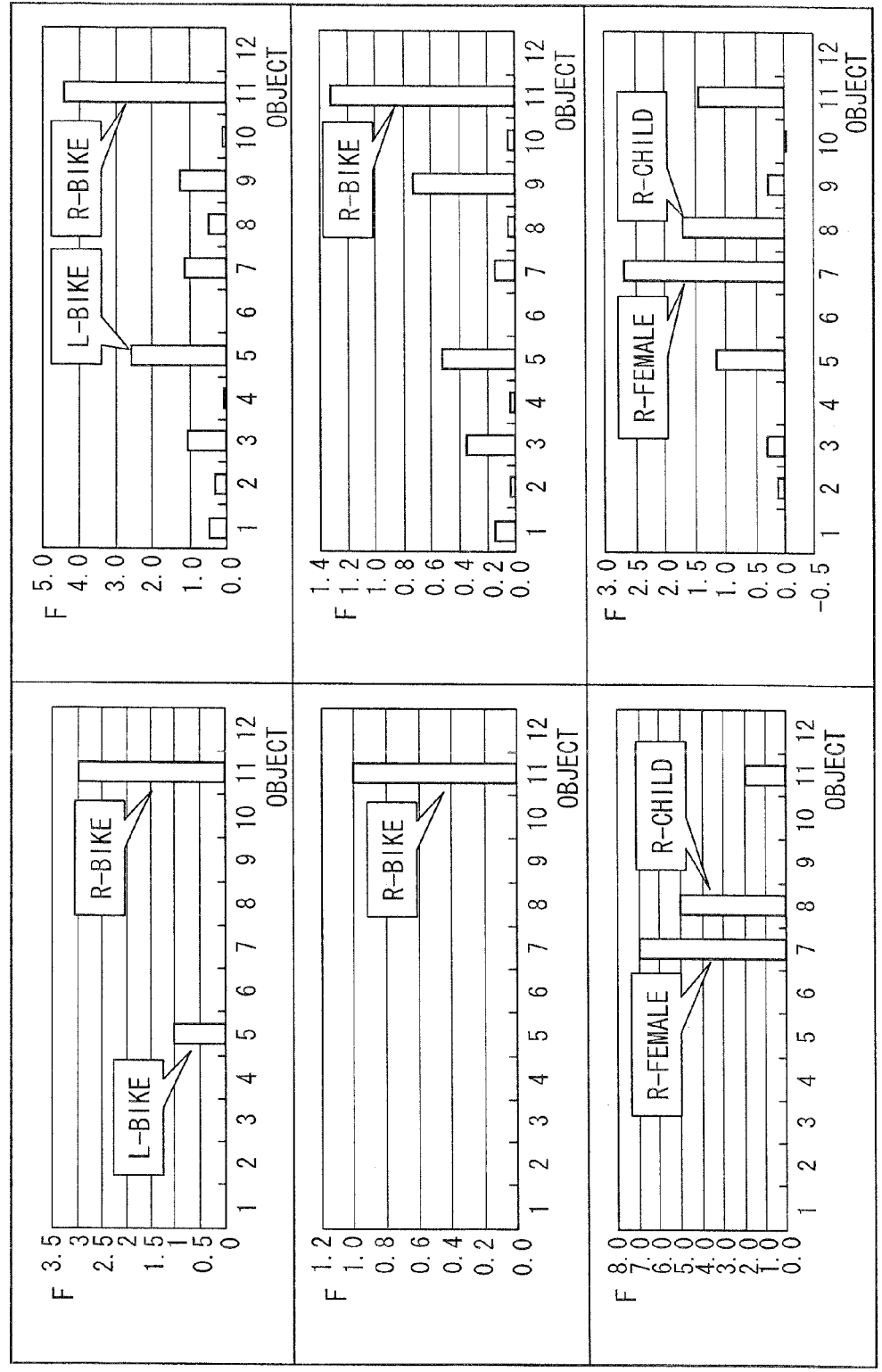
FIG. 19 is a diagram showing examples of output results by an estimating module.
Figure 20:
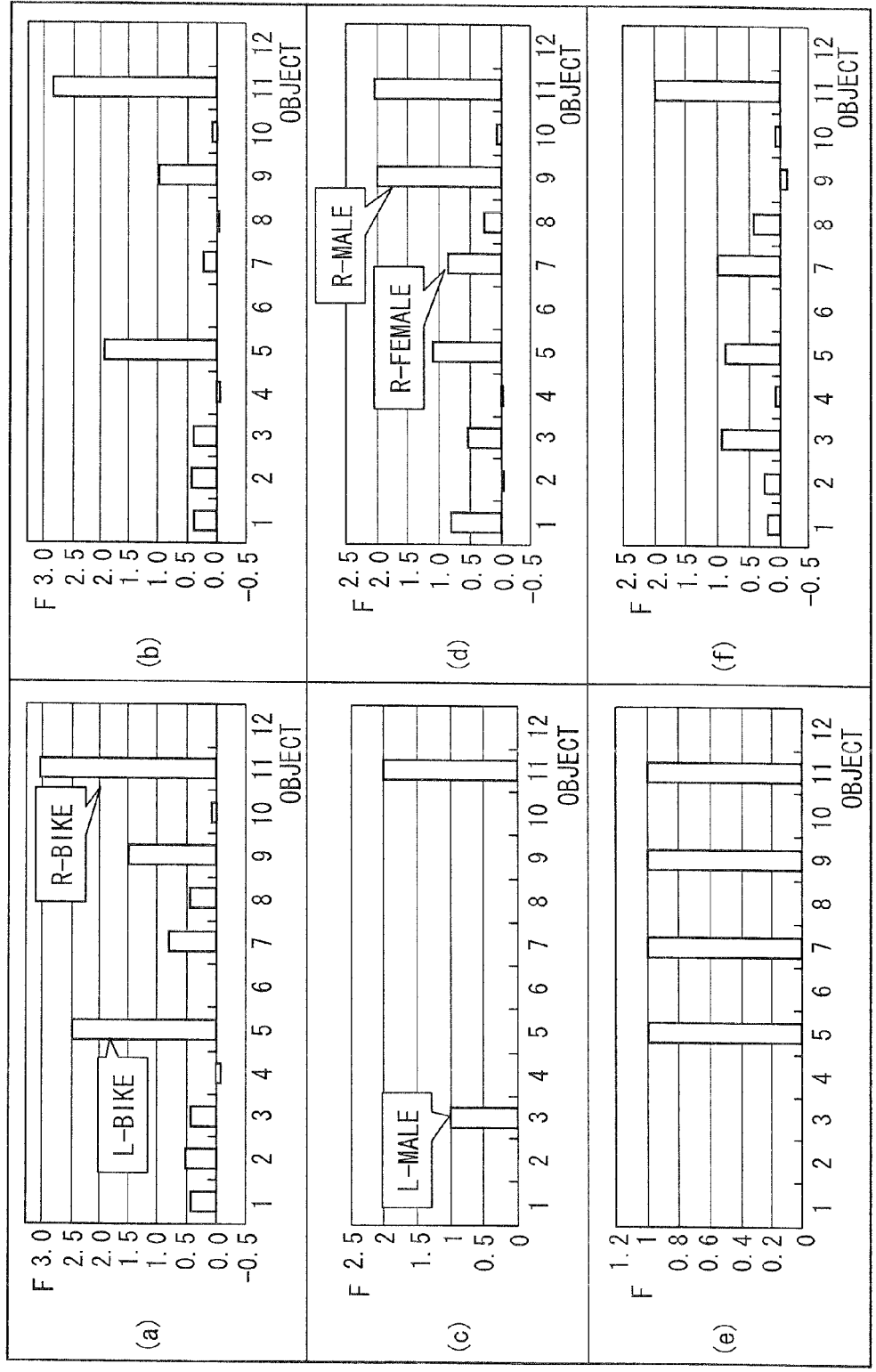
FIG. 20 is a diagram showing examples of output results by an estimating module.

Therefore, a total of dimensions needed to express the status information vector is 28th dimension vector space. FIG. 19 shows graphs arranged on the right and left. The right side graphs are the results of the regression relationship of the feature vector with respect to the status information vector by using the linear least squares method (see the later mentioned formula 17.) These results are handled as results of estimation. That is, the graphs on the left side show results of recognition by a human, and the graphs on the right side show results of the self-crossing type regressive estimation. Here, the vertical axis shows an estimated frequency "F". The numbers on the graphs represent objects as follows: "1" is a woman on the left "L-female"; "2" is a child on the left "L-child"; "3" is a man on the left "L-male"; "4" is an unknown on the left; "5" is a bike on the left "L-bike"; "6" is a dog on the left; "7" is a woman on the right "R-female"; "8" is a child on the right "R-child"; "9" is a man on the right "R-male"; "10" is an unknown on the right; "11" is a bike on the right "R-bike"; and "12" is a dog on the right. In similar ways, examples of estimation under various situations assumed are shown in FIG. 20.

In addition, the status information vector can be expanded further. For example, time information, such as an influence of the date or the day of the week, an influence of the season, an influence of a time range, and an influence of annual events, may be taken into consideration to define the status information vector. The status information vector may be applying to traffic congestion prediction. Moreover, the status information vector can be expanded to reflect a road environment or a geography factor, which may be performed by quantifying to the vocabulary expressing each factor, e.g., by using a value between 0 and 1.

7-3-5. Estimation Using Reliability Degree

The estimation performance in this embodiment is greatly influenced by the performance of the recognition module 40. Generally the performance of the recognition module 40 may vary according to the movement of the vehicle, such as a stopping and a moving. Regarding moving objects, such as a pedestrian, a recognition rate is usually higher when the vehicle stops, therefore, the reliability degree of the recognition result at a stopping is higher than that at a moving. For example, the recognition rate "Ri" may take over 80 (Ri>80) at a fixed place, i.e., a stopping, and take about 60 (Ri=60) at a moving. Furthermore, since a relative velocity to a pedestrian or a bike becomes high as a driving speed increases, the recognition rate must be decreased.

A status of "stopping" can be further classified in status of places, such as a temporally stop at a crossing, a parking at a road side, a parking at a parking lot. Similarly, the ease of performing image recognition may be greatly affected by the influence of a circumference background when the vehicle is moving. Especially, recognition rate for pedestrians may be greatly affected by a vehicle on an oncoming lane, a vehicle in front of the vehicle, a building, a roadside tree, a guardrail, a road sign, such as a white line on a road, an obstacle on a road, etc.

To reflect such varying recognition rate, the apparatus gives a reliability degree "ri" of the recognition module 40 to the output (certainty degree) of the recognition module 40. A value of the reliability degree may be an average recognition rate according to a type of the place and a driving speed. Thus, it is possible to create space-time information of a recognition result on a map by expressing performance change of the recognition module 40 according to an environmental condition with the reliability degree of the recognition module 40, and by storing the recognition result with the reliability degree in the navigation module 30 or transmitting the recognition result with the reliability degree to the center 70.

A distribution of bike appearance and a distribution of pedestrian appearance may be different from each other. This may be caused mainly by a movement degree and a moving range. An initial setting for the recognition module 40 and the estimating module 50 is performed using this character.

7-3-6. Setting of Reliability Degree

Regarding a setting of a reliability degree of the recognition module 40, the following setting may be employed.

(1) To vary a reliability degree of a recognition rate for each object, such as pedestrians and bikes.

(2) To vary a reliability degree of a recognition rate for each sensing place. Since the following element affects the performance of a recognition module 40 as an environmental feature of a sensing place, it results in change to a reliability degree.

Road: "Width", "Sidewalk width", "Existence or nonexistence of the following items: Roadside barrier; Road sign such as a center line; Electric wire; and Roadside tree.

Relationship: Crossing, Single road.

Place: Shopping town, Residential area, Business area.

(3) To vary a reliability degree of a recognition rate for each sensor (including recognition technique).

(4) Set a reliability degree in accordance with a speed of the vehicle.

For example, a speed may be classified into categories "Stop", "Start", "Safe", "Slow", "Middle", "High".

7-3-7. Upload to Center

In this embodiment, the following uploaded information "xi", "si", "ri", and "fi" are uploaded from the estimation apparatus 10 to the center 70, where "i" indicates the number for identifying the place where a sensing (capturing an image) is performed. "xi" indicates coordinates of the place "i". "si" indicates status of the place "i". "ri" indicates a reliability degree of the recognition module 40 (average recognition rate for every conditions). "fi" indicates a result of the estimating module 50.

Moreover, "si" includes the following information.

(1) Type of the place: Front of station, Residential area, Bussiness area, Park, Seashore, etc.

(2) Road environment: Crossing, Single way, Parking lot, etc.

(3) Driving state: Stop, Start, Safe speed, Cruising, Speed, etc.

(4) Direction of pedestrian from the vehicle: Right side, Front on, Left side, etc.

(5) Recognition result: Pedestrian, Bike(bicycle), Other object.

7-3-8. Matching Among Vehicles

Figure 21:
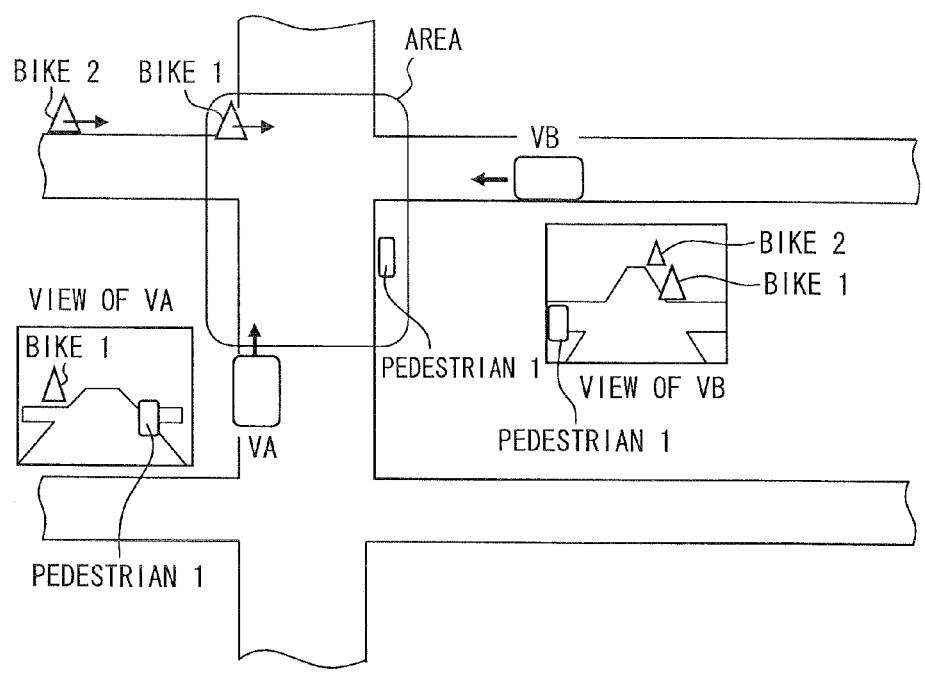
FIG. 21 is a diagram showing image recognition in a plurality of vehicles.

FIG. 21 shows a case where two different vehicles "VA" and "VB" observe the same pedestrian on the same place simultaneously. From a viewpoint of accuracy of the statistics value of appearance of pedestrians, it is preferable to avoid double counting of the same pedestrian by performing a matching between the image captured by the vehicle "VA" and the image captured by the vehicle "VB". However, in order to perform this matching, it is necessary to get a three-dimensional pedestrian position with high precision. On the other hand, from a viewpoint of the danger to an accident, it may be considered that the danger is increased as the number of vehicles observing the same pedestrian increases.

In this embodiment, the following two norms are considered.

(Norm 1) To aim acquisition of statistical data of appearance number of pedestrians.

(Norm 2) The total number of pedestrians is used as statistical data by converting the above into a danger degree.

In general, when a pedestrian group in the same place is observed by both "VA" and "VB", the technical difficulty of taking correspondence is considered relatively high.

To overcome the technical difficulty, there may be the following methods.

(1) Method taking a sum, i.e., calculating the total number of persons.

(2) Method calculating a typical value from a plurality of observed values.

(2-1) Method taking an average value.

(2-2) Method choosing the maximum value.

(3) Method performing an advanced batch processing.

The method (1) corresponds to the (Norm 1.) That is, when the same pedestrian is sensed by images from a plurality of vehicles, the apparatus counts them into a total number. If image data with capturing place is collected to the center 70, the above-mentioned matching may be available by using the method (3).

7-3-9. Time Range of Estimation

Based on an idea in which vehicles (estimation apparatus 10) represented by probe cars upload images to the center 70, it is possible to perform a large-scale and advanced processing to the uploaded images to recognize pedestrians and others.

In this case, the vehicles which receive service can receive information estimated about a place which distanced from the vehicle by a distance which corresponds to a delay time including a communication time between the vehicle and the center 70 and a calculation time in the center 70. In a case that a service receiver needs a forecast immediately even if the reliability degree of estimation is somewhat low, it may be possible to receive the pedestrian appearance frequency estimated from the statistical information about a present place of the vehicle immediately from the center 70.

7-4. Processing to Improve Recognition Module 40

Next, the processing about the improvement in performance of the recognition module 40 shown by B30 in FIG. 7 is explained. In S240, recognition parameters are set. The recognition parameters are parameters used for image recognition.

In S250, the apparatus recognizes pedestrians in a image. This processing is performed by the recognition module 40 based on data from the camera module 41. In S260, the result of recognition in the above is converted into an appearance frequency for each one of partial areas.

In S270, the apparatus evaluates a differential "DF". In S280, it is determined whether the differential "DF" is equal to or smaller than a threshold value "DFth". If it is determined that the differential is equal to or smaller than the threshold value (S280: YES), a reliability degree is calculated in S290 and the routine proceeds to S310. On the other hand, if it is determined that the differential is greater than the threshold value (S280: NO), recognition parameters are corrected and the processing from S240 is repeated.

7-4-1. Improvements of Recognition Module 40

In a case that estimation is an objective, it is not necessary to perform a recognition operation of an image in a real time and on-vehicle fashion. It may be possible to transmit image data and place information to the center 70, and carry out batch processing for large amount of images in the center 70. A recognition method suitable for such an image transmission is also available. In the following description, it is described to improve performance of the recognition module 40 supposing an interaction between the estimating module 50 and the recognition module 40.

7-4-2. Setting of Recognition Parameters (1) Setting Based on the Past Data

Parameters of the image recognition to be performed from now on are set by using initial values which are obtained by a space-time distribution of the pedestrian appearance frequency estimated from the past data. For example, it is possible to perform it as follows.

In a place where many groups commuting to school are expected, it is preferable to set the recognition parameters thought to be suited for recognizing a plurality of groups.

In a place where many bikes are expected, it is preferable to set the recognition parameters especially adjusted for bikes.

Weighting process is performed to put weight on a place of the partial areas (refer to FIG. 18) on an image and a place on a map by using the past data.

(2) Setting According to Target Object (2-1) Setting Based on Movement Degree and Moving Range Since a bike and a human are different in the movement degree, distributions of the appearance frequency also differ. The recognition module 40 and the estimating module 50 are set up by using this characteristics.

For example, in a case of a target object with high movement degree, such as a bike, even when the vehicle overtook a bike in the past, the same bike may overtake the vehicle at a traffic light and may appear in front of the vehicle again. In order to recognize the object even in such a case, appearance estimation in a time range over a plurality of adjoining space ranges is needed. In this embodiment, one space range is one zone on a driving path which is a calculation target of the estimated frequency in this embodiment. For example, three areas "xa", "xb", and "xc" may be arranged along a scheduled driving path in a manner that the areas adjoin in their order. In this case, there may be a case where the apparatus observes and senses a bike "B" which moves in the same direction as the moving direction of the vehicle. In this case, the apparatus may increase the estimated frequency for a bike in advance, since the vehicle may observe and sense the same bike "B" again on a crossing which exists on "xb" or "xc" with certain probability.

(2-2) Setting Based on Image Feature of Object

Here, the recognition module 40 and the estimation module 50 are set up by using factors of objects. The factors may include shape of objects, space spectrum of objects (DCT coefficients etc.), movement of objects, image feature (including color) of objects, and recognition characteristic expressed by a feature vector of time series change of the factors. The recognition characteristic may correspond to a regression coefficient matrix in the multi-variable regression analysis, and to a peculiar matrix in the principal component analysis.

(2-3) Limitation of Recognition Area

Possible existence area of pedestrians (a sidewalk, a drive lane, a parking lot, stairs, etc.) may be generally limited in a statistical manner. However, since a position and direction of a camera on the vehicle to capture objects may vary in accordance with a mounting position of the camera on the vehicle and a driving condition of the vehicle, an image appearance of a pedestrian may be varied in each image of scene. However, since the camera is mounted on the vehicle, the change of the image appearance of a pedestrian can be patternized to some extent. Therefore, it is still possible to limit a possible existence area of pedestrians as a two-dimensional area in a captured image in case-by-case.

(2-4) Setting According to Expected Pedestrian Type

As is disclosed in JP2009-271758A, the parameters may be set with values suit for and matched with a recognition characteristic selected in accordance with types of pedestrians, such as a child and an elderly. Here, the parameters may be set up based on statistical data in the past or a surrounding environment. For example, in a case that there may be many children at age of school in that area, recognition parameters may be set up to match a height of child, or a movement of child in a prioritized manner. The recognition parameters may include at least one of a determination threshold relating to an AC electric power of the DCT coefficient, a determination threshold of principal electric power, and a generating status of movement. For example, in a case that there may be many solo elderly walkers, the parameters may b adapted to such elderly in a prioritized manner.

7-4-3. Principle of Recognition Module 40

As is disclosed in JP2007-060273A and JP2007-072987A, if a reliability degree of an object, which may be existed in an image, is expressed by using the multivariate linear regression model with respect to a featrue amount of image data, a result of recognition for pedestrians may be expressed by the following formula.

$$C_B = S_B B$$

$$s_B = [s_s^T s_P^T]^T \quad \text{(FORMULA 11)}$$

Here, "$C_B$" is a matrix of "K×N". An element "$(C_B)_{kn}$" on the k-th row and the n-th column expresses a certainty degree in case that the k-th partial area in an image is an object of the category "n". In a case that the recognition is merely performed to recognize whether an object is a pedestrian or not, the matrix "$C_B$" may be expressed as a column vector by setting N=1. In this case, an element on the k-th row expresses a certainty degree that an object on the k-th partial area in an image is a pedestrian. For example, the k-th partial area corresponds to a block of pixels in a captured image. If there are categories of N>1 about a pedestrian, an element "$(C_B)_{kn}$" expresses a category "n" pedestrian, e.g., a man, a woman, or a child, in the partial area "k". Alternatively, by setting N=2, it is possible to assign a pedestrian certainty degree and a non-pedestrian certainty degree to each of "n=1" and "n=2". Further, it is also possible to add a direction factor, such as Right, Front, Left, in categories of pedestrian. However, since the recognition module 40 is generally required higher performance as the number of categories of classification is increased, it is more realistic to limit the number of categories low, such as an existence and non-existence of pedestrians while using the present image recognition technology.

"$S_B$" is a matrix of "K×L". SB contains a row vector "$s_B^T(k)$" in the k-th row. "$s_B^T(k)$" is obtained by transposing a feature vector "$s_B$" (L-th dimension column vector) which consists of a status information vector "$s_s$" and an image feature vector "$s_p$". "B" is a regression coefficient matrix of "L×N" to these amounts of the features. It is possible to obtain "B" by using the least squares method. "B" may be expressed as the following formula 12.

$$B=(S_B^T S_B)^{-1} S_B^T Y_B \quad \text{(FORMULA 12)}$$

Here, in order to calculate an initial value of "B", it is necessary to put a ground truth (GT) into $Y_B$(K×N), and to put amounts of the features into "$S_B$". GT is a correct value which is obtained by a human who evaluates a sample image. The amount of feature, such as an image, corresponds to each one of "$S_B$". The apparatus recognizes pedestrians in a new scene by using the "B". Reliability degree of the recognition at that time may be calculated as an average recognition rate. However, since it is almost impossible to obtain GT in real time basis after the vehicle started to run, a subsequent recognition history serves as a presumed certainty base in real time. On the other hand, GT may be obtained to images captured during a drive, if uploading to the center is performed or off-line processing is performed after the drive.

In addition, regarding recognition processing for pedestrians, it is possible to apply methods and system disclosed in JP2009-271758A. In this document, time series feature amounts are arranged based on DCT coefficients of differential image, and a pedestrian is recognized by the principal component analysis. In this case, the framework of the recognition using the regression coefficient after it can apply as it is by arranging "$S_B$" in the formula 11 from feature amounts of which dimension is compressed by the principal component analysis. This may be referred to as the principal component regression analysis. Other than the above mentioned methods, there are many methods, including nonlinear technique, such as the SVM, the dynamic template method, the method of using a motion vector, etc. In a case of recognition methods which are categorized in a learning or adaptive type method, the method and the above mentioned case show similar situations and problems, such as an improvement in a recognition rate according to an increase of learned values, over learning (over fitting), learning failure, an abnormal value, and a missing data, etc. Those details are not described in detail in this embodiment.

7-4-4. Estimating Module 50

According to the multi-variable regression estimation, the matrix $F_P$(K$_P$×M) of the estimated frequency based on the statistic data in the past may be expressed by the following formula.

$$F_P = S_P P$$

$$S_P = [s_P^{(1)} \dots s_P^{(KP)}]^T$$

$$s_P = [s_{time}^T, s_{env}^T, s_{place}^T]^T \quad \text{(FORMULA 13)}$$

In the above formula, "P" is a regression coefficient matrix of "L$_P$×M", "$s_P$" is a feature vector of "L$_P$×1", and "$S_P$" is a feature matrix of "K$_P$×L$_P$". "P" may be calculated by the following formula using the Least Squares method similar to the case of the recognition module 40.

$$P=(S_P^T S_P)^{-1} S_P^T Y_P \quad \text{(FORMULA 14)}$$

Data-matrix $Y_P$(K$_P$×M) of the estimated frequency may be created by using a certainty matrix "$C_B$" (recognition result for every partial area in an image) which is calculated by the recognition module 40 on the vehicle. This processing may be performed by counting the number of pedestrians from the partial area determined as pedestrians in "$C_B$", and converting it into a value of the appearance frequency in the partial domain (M pieces in the image) in the predetermined estimation area. Now, this conversion processing is expressed by the following formula.

$$Y_P = \Psi(C_B) \quad \text{(FORMULA 15)}$$

If the reliability degree of "$C_B$" takes a value "$R_B$" ("$R_B$" is nearly equal to 70), the reliability degree of the regression coefficient matrix "P" which uses "$Y_P$" generated from "$C_B$" as learning data will be around "$R_B$" Here, the truth value estimated by this recognition machine is called ET (Estimated Truth).

If the correct answer value (GT) is available, the "$R_B$" may become about 100%. The correct answer value may be provided by a human or a perfect recognition module 40 in an off-line processing manner, etc. Conditions for estimation may be logically classified as follows by using the ET and GT.

(1) No statistical data in the past (No GT and ET)
(2) No GT, but ET is available
(3) GT is available, and no ET
(4) Both GT and ET are available in a mixed manner In order to systematically express the cases above, a value of "$R_B$" may be attached to recognition data. In a case that both GT and ET are mixed in "$C_B$", by assuming the above-mentioned formula 4, "$C_B$" may be expressed by the following formula.

$$\hat{Y}_P = \begin{bmatrix} r_l f_{l1} & \dots & r_l f_{lM} \\ r_k f_{kl} & \dots & r_k f_{kM} \\ r_K f_{Kl} & \dots & r_K f_{KM} \end{bmatrix} \quad \text{(FORMULA 16)}$$

$$= \text{diag}(r_l \dots r_K) Y_P$$

$$= \text{diag}(r_l \dots r_K) \Psi(C_B)$$

That is, a value of an effective certainty degree of each learning event may be expressed by the product of the reliability degree of the recognition module 40 and the certainty degree outputted by the recognition module 40. "M" is a maximum number of partial areas in a place "k". the partial area is an area where pedestrians can exist. An example of partial areas is shown in FIG. 18. The partial area may be defined by categories, such as "on a road or off a road", "right side or left side on the driving direction", etc.

"$r_k$" is a reliability degree of the recognition module 40 used for the image at the point "k". GT obtained by a human mostly takes value 1. In detail, since it may be influenced by skill, it may become less than 1.

"$f_{km}$" is the number of pedestrians (appearance frequency of pedestrians which the recognition module 40 outputted)

recognized in the m-th partial domain in a image captured at the point "k". By using the $Y_P\hat{}$ as statistical data in the past, Approximate value $F_P\hat{}$ of the matrix $F_P$ of the estimated frequency may be calculated as shown in the following formula.

$$\hat{F}_P = S_P \hat{P}$$

$$\hat{P} = (S_P^T S_P)^{-1} S_P^T \hat{Y}_P \quad \text{(FORMULA 17)}$$

The reliability degree $R(F_P\hat{})$ of the certainty degree $F_P\hat{}$ may be expressed as the following formula, for example.

$$R\{\hat{F}_P\} \geq 70\% \quad \text{(FORMULA 18)}$$

If the above formula 18 is satisfied, it may be determined that the total performance of the estimating module 50 and the recognition module 40 satisfies requirements for service.

7-4-5. Sensing on Same Place

Regarding a plurality of observed values on the same place and time, the apparatus performs a summing calculation by considering the certainty degree based on each observed value as a score, and performs a threshold determination on an average value or a total value. For this processing, a plurality of recognition modules 40 accumulate recognition results (certainty degree vectors) with respect to a plurality of images captured in the same space-time zone XTθ (XT-Theta). The plurality of images are captured in the same predetermined area "X" at the same time range "T" on the same driving direction "θ" (Theta). That is, it is shown by the following formula.

$$f(x_k, s_l) = \frac{1}{(N+1)}\left\{\sum_{n=1}^{N} r_n f_n(x_k, s_l) + f_0\right\} \quad \text{(FORMULA 19)}$$

$$f_n = (f_{n1}, \ldots, f_{nM})^T$$

Here, "$r_n$" may be expressed as follows.

$$r_n = \begin{bmatrix} r_{n1} & 0 & \ldots & \ldots & 0 \\ 0 & \ddots & 0 & \ldots & 0 \\ 0 & 0 & r_{nm} & 0 & 0 \\ 0 & \ldots & 0 & \ddots & 0 \\ 0 & \ldots & 0 & 0 & r_{nM} \end{bmatrix} \quad \text{(FORMULA 20)}$$

"n" is an identification number for recognition modules, and may take n=1, ..., N.

"$f_0$" is an initial value of a pedestrian frequency vector.

"$f_n$" is a pedestrian frequency vector which is outputted by the n-th recognition module.

"f" is an average value of the output of N recognition modules.

"$s_l$" is a status information vector at least including time (the subscript "l" is an integer indicating the index of discrete time.)

The processing is performed for each one of target place "k" by the above formula 19. In this case, even if the reliability degree of the recognition module 40 is relatively low, it is expected to make it possible to output a certainty degree with a sufficient reliability degree as a whole by an accumulating effect of the reliability degrees.

7-4-6. Observation from One Vehicle

The recognition result, a capturing time, and a capturing place of an on-vehicle camera are associated with and linked to a map of the navigation module, and are stored in the storage module. As a result, data observed by the vehicle is stored in the storage module in an accumulating manner. Therefore, it is possible to search a history of passing time "$s_l$" till then by specifying position "$x_k$" through the navigation module. By defining the time information by the status information vector "s", it is possible to search the other circumference status information or a point "x" the vehicle passed. In a case that the vehicle passes the same route repeatedly, it may become possible to perform estimation about the point on the route by using the observed data accumulated in the vehicle. Here, the estimation means processing for estimating an appearance frequency of people in the future time which is not yet stored in the accumulated data. This estimation becomes possible by assuming a space-time basis distribution depending on a date kind, a day of the week, and a time range.

In a case that a pedestrian appearance frequency in a scheduled place where the vehicle will driven through in the future from statistical data in the past stored in the vehicle, a result may be obtained by calculating the following formula by using the formula 17.

$$f_0^T = [x_k^T, s_l^T]\hat{P} \quad \text{(FORMULA 21)}$$

In this formula, "$x_k$" has components. Each components corresponds to a vocabulary which identifies a place assigned with the number "k" in a geographical manner, i.e., non-numeric information. The vocabulary means linguistic expression about coordinates or the name of a place. Each component takes a value which is given for the vocabulary based on the qualification theory.

In detail, the component is set "1" when each vocabulary is specified as a candidate for estimation, otherwise, the component is set "0".

"$s_l$" has components. Each components corresponds to a vocabulary which identifies a discrete time which assigned with the number "l". The vocabulary means a season, month, a day of the week, a time range. The component is set "1" when it is specified as a condition for estimation, otherwise, the component is set "0". Further, a supplemental circumstance of "$x_k$" in the discrete time 1 can also be described within this vector. The supplemental circumstance may include weather, an ambient environment, etc.

An error ΔF (Delta-F) between an actual value $F_1$ and an estimated value $F_0$ can be expressed in the following formula. The actual value $F_1$ is a value that is actually observed by the vehicle at the place which is used as the candidate for estimation.

$$\Delta F = F_1 - F_0$$

$$F = [f_1, f_2, \ldots, f_{K_F}]^T$$

$$F_1 = F_P(x_k, s_l) = S_P(x_k, s_l) P$$

$$s = [s_{time}^T, s_{env}^T, s_{place}^T]^T \quad \text{(FORMULA 22)}$$

7-4-7. Classification of Statistical Data

The statistical data used as the input of the estimating module 50 may be obtained from the following sources.

(1) The output (ET) of the recognition module 40 on the vehicle or GT by a human input.

(2) The output of a recognition module in the center or GT by a human input.

(3) The recognition result (ET) by the portable terminal or PC, or GT by a human input.

(4) The recognition result (ET) by a fixed point observation infrastructure, or GT by a human input.

It is desirable to classify the above-mentioned statistical data into the following category in advance according to the viewpoint of danger.

(a) About Pedestrian: a pedestrian on a road, or a pedestrian off a road.

(b) Right side or Left side with respect to a driving direction.

It is possible to improve effectiveness by performing estimation after performing the above mentioned classification. This may be actually practiced easily by dividing the observed area into M partial areas from the view of a driver, and reflecting and compounding them into the feature vector.

7-4-8. Improvements of Recognition Module 40

If the differential between the estimated appearance frequency calculated by the estimating module 50 and the appearance frequency calculated by the recognition module 40 from the image captured at the time of driving is large, it is necessary to perform a correct about at least one of the estimating modules 50 and the recognition modules 40. Here, a magnitude of the differential may be expressed as a scalar value by the following formula.

$$E_P = \sum_{i=1}^{K_P} \sum_{j=1}^{M} |\Delta F_{ij}| \quad \text{(FORMULA 23)}$$

This can be interpreted as an estimated error electric power based on an absolute value norm. When "EP" exceeds a threshold value "EPTH", correction processing about both the estimating module 50 and the recognition module 40 is performed. However, it is restricted to the following cases that a large correction is needed about the estimating module 50 of the formula 4.

(1) Regarding $F_{ATR}$, in a case that settings about an attractor and a time gate have largely mistaken.

(2) Regarding $F_{RFP}$, in a case that the quality or quantity of learning data is not enough.

In the embodiment, since the image recognition is not involved, the case (1) is put outside of consideration, and the case (2) is handled. Although performance may change by what kind of estimation processing is used for $F_{RFP}$, the following description is directed to a case of one estimating processing and correction of this case. In this embodiment, the estimating processing is the multi-variable linear regression estimation by using the formula 13 and 14.

It was already discussed that the output with a reliability degree of the recognition module 40 is used as learning data of the estimating module 50, because it is generally difficult to create all learning data of the estimating module 50 by using a help of a human. Therefore, the problem for improving the estimating module 50 may be concluded as a problem for improving performance of the recognition module 40.

There are the following two techniques to improve performance of the recognition module 40.

(IP1) To improve quality and quantity of learning data of image recognition.

(IP2) To improve setting of parameters for image recognition.

First, regarding (IP1), processing to increase the number of learning data is performed until the following restricting formula is satisfied.

$$\{f(x_k, s_l) \geq fth\} \text{ AND } \{\Phi(x_k, s_l, N) \geq \Phi th\} \quad \text{(FORMULA 24)}$$

$$\Phi(x_k, s_l, N) = \left\{ \sum_{n=1}^{N} r_n f_n(x_k, s_l) + f_0 \right\}$$

$$f(x_k, s_l) = \frac{1}{(N+1)} \Phi(x_k, s_l, N)$$

$$f_n = (f_{n1}, \ldots, f_{nM})^T$$

"$r_n$" is shown in the above-mentioned formula 20.

That is, the improving processing increases the number of learning data until both an average value of the recognition module 40 is equal to or more than a first threshold value (fth) and the sum total value of the certainty degree of the probe reaches to a second threshold value (φth (Phi-th)) are satisfied. This processing may be performed by downloading image recognition results with reliability degree which were collected by the center via the probe system as learning data. Alternatively, this processing may be performed by downloading a recognition characteristic (regression coefficient matrix) calculated in the center in advance. The apparatus repeats the above-mentioned estimation and recognition process again after the processing "IP1" is completed, then, evaluates a differential again by the formula 22. The apparatus calculates "EP" of the formula 23 again, and if "EP" is equal to or smaller than a threshold value "EPTH", correction processing will be completed. If EP>EPTH is satisfied the technique "IP2" will be commenced.

The apparatus repeats processing of "IP2", estimation, recognition, and evaluation of "EP", then, complete processing when "EP" is equal to or smaller than "EPTH". If "EP" can not reach to a level equal to or smaller than "EPTH" within a predetermined range of parameters, the apparatus completes correction processing, and adopts a parameter when EP takes the minimum provisionally. In this case, the apparatus may ask the center to provide an example of appropriate settings of the recognition module 40 used in the other vehicle, and use it.

8. Results and Advantages

In this embodiment, the apparatus calculates a value $F_{PFP}$ (S180) by searching an appearance frequency data in the past (S170 in FIG. 6). In detail, an estimated result that is an output of an estimating module 50 is expressed as a vector. Objects to be estimated are classified into a total of 12 kinds, such as a "man, woman, child, bike, unknown, dog" and a "right, left". Feature vector of appearance frequency of pedestrians observed by one of a camera mounted on the vehicle, i.e., objective variables of estimation, is expressed by 12th dimension vector space. Moreover, status information is used as explaining variables, which explain a feature vectors when a feature vector occurs. The status information includes "a place, time, weather". Here, the place can be expressed by 3rd dimension vector space, in which each dimension corresponds to a section. The time can be expressed by 22nd dimension vector space including a "year, month, day of the week". The weather can be expressed by 3rd dimension vector space including a "fine, cloudy, rain". The regression relationship of the feature vector with respect to the status information vector expressed in a total of 28th dimension vector space is solved by the linear least squares method.

As explained above, an appearance frequency of an object in a predetermined estimation area is estimated by the estimating module 50 based on the frequency data. The frequency data is the frequency data in the past, which includes space-time information (status information vector) and frequency information (feature vector).

Thereby, it is possible to estimate the appearance frequency of objects, such as a pedestrian, in the predetermined estimation area appropriately. In this embodiment, the apparatus includes the camera module 41 which captures an image of view from the vehicle, and the recognition module 40 which generates frequency information from an image recognition result based on the image captured by the camera module 41 (refer to FIG. 1). Thereby, it is possible to collect frequency data on the vehicle.

In this embodiment, the apparatus includes the calculating module 45 which calculates the reliability degree for the image recognition result by the recognition module 40 (refer to FIG. 1). The calculating module 45 calculates a reliability degree based on at least one of the following factors, such as a kind of object, a sensing place, a sensor and recognition technique for image recognition, and a driving speed of the vehicle (S290 in FIG. 7). By calculating the reliability degree, it is possible to perform weighting process for accumulated results of the image recognition result by using the reliability degree as a weight. As a result, it is possible to use the image recognition results by the recognition module 40 as learning data of the estimating module 50.

In this embodiment, the data communication module 20 uploads the information on the place where the vehicle run, the image recognition result by the recognition module 40, the reliability degree calculated by the calculating module 45, and the estimation result of the estimating module 50 to the center 70 (S310 and S320 in FIG. 7). Thereby, the vehicle, which carries the estimation apparatus 10, may be worked and functioned as a probe car for providing information to the other vehicles which requested information about the predetermined area. Moreover, since a reliability degree is uploaded, the image recognition results accumulated in the center 70 may be evaluated by the apparatus by using the reliability degrees as weighing data for corresponding result. Furthermore, since the estimation result by the estimating module 50 is uploaded, it is possible to distribute the estimation result from the center 70 to at least one of vehicles, which do not possess the estimating module 50 (See FIG. 3). Of course, even in a case that the estimation result is not transmitted to the center 70, the estimation processing may be performed by the center 70 side and the estimation result obtained in the center 70 may be distributed to the vehicles. This may be performed by the large-scale forecasting module 76 and the center transmitter module 77 in FIG. 4.

As shown in FIG. 1, this embodiment has the parameter setting module 42 which sets the recognition parameters for image recognition performed in the recognition module 40. The parameter setting module 42 sets at least one recognition parameter according to the target object based on data of appearance frequency in the past. This contributes to improve an image recognition performance.

At least one recognition parameter is corrected in S300 in FIG. 7, when the differential of the estimation result by the estimating module 50 and the image recognition result by the recognition module 40 is equal to or more than the threshold value in S270 in FIG. 7. Thereby, the performance improvement of the recognition module 40 is achieved.

In addition, in a case that the differential between the estimation result by the estimating module 50 and the image recognition result by the recognition module 40 is equal to or more than a threshold value (S270 and S280 in FIG. 7), the apparatus may be configured to acquire uploaded information which is accumulated in the center 70. By employing a configuration described above, it is possible to improve a possibility that the quality and quantity of learning data of the recognition module 40 becomes high. As a result, it is possible to contribute to reduce the differential between the estimation result by the estimating module 50 and the image recognition result by the recognition module 40.

In this embodiment, even when there is no frequency data in the past, the appearance frequency of an object is estimated from a geographical factor etc. In S160, FATR is calculated based on the information about attractors, such as a school, a store, a shopping center, a hospital, a station, a theme park, a hall, a baseball field, a bus stop, a station, and a park, which are acquired by S130 and S150 in FIG. 5. In detail, the apparatus performs setting processing to set the time gate (TG) based on the information about the attractor (S440 in FIG. 8), and dividing processing of appearance frequency at a branch by considering and supposing propagation of the rectangular wave which is defined based on the time gate (S451-S453, and S456 in FIG. 9). Therefore, the estimating module 50 estimates the appearance frequency of the object in the predetermined estimation area by considering propagation of the rectangular wave which is divided at a branch from the attractor to the predetermined area. Thereby, even when there is little amount of frequency data in the past, it is possible to estimate an appearance frequency of an object based on a geographical factor etc. Moreover, since the rectangular wave is defined based on the time gate, it is possible to estimate an appearance frequency of an object resulting from an attractor comparatively easily. The estimating module estimates an appearance frequency of an object in a predetermined estimation area by considering a distance between the attractor and the predetermined area and the time gate. Furthermore, the rectangular wave defining the time gate is initialized to have height corresponding to an average accommodation number of people in an attractor. Thereby, it is possible to define and handle the time gate as a comparatively simple rectangular wave. The estimating module 50 estimates an appearance frequency of an object in a predetermined estimation area based on the reverse propagation in which the rectangular wave propagates in a reverse direction of time. Thereby, it is possible to estimate an appearance frequency of an object at that time or at the time before based on a time when the object comes to or arrives to an attractor or when the object leaves from the attractor. In addition, the estimating module 50 estimates the appearance frequency of the object in the predetermined estimation area by considering a passing time of the vehicle in the predetermined area. As a speed of the vehicle increases, a passing time of the vehicle through the predetermined area becomes short. Thereby, the appearance frequency of an object can be estimated certainly.

The data communication module 20 in this embodiment corresponds to a "frequency data acquisition module" and a "transmitting module". The estimating module 50 corresponds to an "estimating module". The camera module 41 corresponds to a "camera module". The recognition module 40 corresponds to a "recognition module". The calculating module 45 corresponds to a "calculating module". The parameter setting module 42 corresponds to a "parameter setting module".

The processing provided by S130 and S150 in FIG. 5 corresponds to the processing provided as a function of an "attractor information acquisition module". The processing provided by S440 in FIG. 8 corresponds to the processing provided as a function of a "time gate setting module".

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An object appearance frequency estimating apparatus mountable on a vehicle, and being capable of estimating an appearance frequency of an object on an outside of the vehicle in a predetermined estimation area, comprising:
    a storage module;
    a frequency data acquisition module operatively connected to the storage module, and configured to acquire frequency data relating to the appearance frequency of the object based on previously collected data, the frequency data including previously collected space-time information, and frequency information for defining the appearance frequency with respect to the previously collected space-time information, and further configured to store the acquired frequency data in the storage module, and to output an appearance frequency signal;
    an estimating module operatively connected to the storage module and the frequency data acquisition module, and configured to process the appearance frequency signal received from the frequency data acquisition module, to estimate an appearance frequency of the object in a predetermined estimation area based on the appearance frequency signal to generate an estimated appearance frequency signal to enable the object to be identified, and to store the estimated appearance frequency signal of the object in the predetermined estimation area in the storage module; and
    a notifying module operatively connected to the estimating module, configured to generate a driver warning when the estimated appearance frequency signal comprises at least one of a pedestrian, a bike and an animal in the predetermined estimation area, and configured to generate the driver warning when the estimated appearance frequency signal comprises at least another of pedestrian, bike, and animal that is different from the at least one of the pedestrian, the bike, and the animal, wherein
    the previously collected space-time information is defined as a status information vector which uses status information as explanatory variables, the status information including place, time, and weather information,
    the frequency information is defined as a feature vector which is expressed by using feature information as an objective variable, and
    the feature information includes information about types of objects and information about a partial area provided by dividing a view from the vehicle into a plurality of areas.

2. The object appearance frequency estimating apparatus in claim 1, wherein
    the estimating module estimates appearance frequencies of objects in the predetermined estimation area by solving the regression relationship of the feature vector with respect to the status information vector by using the linear least squares method.

3. The object appearance frequency estimating apparatus in claim 1, further comprising:
    a camera module which captures view from the vehicle; and
    a recognition module which generates the frequency information based on a result of image recognition on an image captured by the camera module.

4. The object appearance frequency estimating apparatus in claim 3, further comprising:
    a calculating module which calculates a reliability degree of the result of image recognition by the recognition module.

5. The object appearance frequency estimating apparatus in claim 4, wherein
    the calculating module calculates the reliability degree based on at least one of the following factors, a kind of object, a sensing place, a sensor and recognition technique for image recognition, and a driving speed of the vehicle.

6. The object appearance frequency estimating apparatus in claim 3, further comprising:
    a transmitting module which uploads upload information including information about a point where the vehicle runs and the result of image recognition by the recognition module to a center which handles the upload information.

7. The object appearance frequency estimating apparatus in claim 6, wherein
    the upload information includes the reliability degree calculated in the calculating module.

8. The object appearance frequency estimating apparatus in claim 6, wherein
    the upload information includes a result of the estimating module.

9. The object appearance frequency estimating apparatus in claim 3, wherein
    the center accumulates the upload information, and the apparatus further comprising a module which acquires, in a case that a differential between a result of estimation by the estimating module and a result of image recognition by the recognition module is equal to or more than a threshold value, the upload information accumulated in the center.

10. The object appearance frequency estimating apparatus in claim 3, further comprising:
    a parameter setting module which sets a recognition parameter for image recognition into the recognition module.

11. The object appearance frequency estimating apparatus in claim 10, wherein
    the parameter setting module sets at least one of the recognition parameter based on data of appearance frequency in the past.

12. The object appearance frequency estimating apparatus in claim 10, wherein
    the parameter setting module sets the recognition parameter in accordance with a target object.

13. The object appearance frequency estimating apparatus in claim 10, wherein
    the parameter setting module corrects the recognition parameter in a case that a differential between a result of estimation by the estimating module and a result of image recognition by the recognition module is equal to or more than a threshold value.

14. The object appearance frequency estimating apparatus in claim 1, further comprising:
    an attractor information acquisition module which acquires information about an attractor which is an element being capable of attracting people and of driving those people to come to there and leave from there; and a time gate setting module which sets up a time gate which shows an existence probability of the object in the attractor, the existence probability being affected by a time factor, and wherein the estimating module estimates the appearance frequency of the object in the predetermined estimation area by considering a distance between the attractor and the predetermined area and the time gate.

15. The object appearance frequency estimating apparatus in claim 14, wherein the time gate is defined by a rectangular wave which has height corresponding to the appearance frequency of the object, and the estimating module estimates the appearance frequency of the object in the predetermined estimation area by considering propagation of the rectangular wave which is divided at a branch from the attractor to the predetermined area.

16. The object appearance frequency estimating apparatus in claim 15, wherein the rectangular wave defining the time gate is initialized to have height corresponding to an average accommodation number in the attractor.

17. The object appearance frequency estimating apparatus in claim 15, wherein the estimating module estimates the appearance frequency of the object in the predetermined estimation area based on a reverse propagation in which the rectangular wave propagates in a reverse direction of time.

18. The object appearance frequency estimating apparatus in claim 14, wherein the estimating module estimates the appearance frequency of the object in the predetermined estimation area by considering a passing time of the vehicle in the predetermined area.

19. In a vehicle-mountable-object appearance frequency apparatus, a method for estimating an appearance frequency of an object outside of a vehicle in a predetermined estimation area for use in a vehicle-mountable object appearance frequency apparatus, comprising:

acquiring frequency data relating to the appearance frequency of the object based on previously collected data, the frequency data including previously collected space-time information for defining space-time, and frequency information for defining the appearance frequency with respect to the previously collected space-time information;

estimating an appearance frequency of an object in a predetermined estimation area based on the acquired frequency data to generate an estimated appearance frequency signal;

generating a driver warning when the estimated appearance frequency signal comprises at least one of a pedestrian, a bike and an animal in the predetermined estimation area; and generating the driver warning when the estimated frequency signal comprises at least another of pedestrian, bike, and animal that is different from the at least one of the pedestrian, the bike, and the animal, wherein the object is at least one of a pedestrian, a bike, and an animal, the previously collected space-time information is defined as a status information vector which uses status information as explaining variables, the status information including a place, a time, and weather information, the frequency information is defined as a feature vector which is expressed by using feature information as an objective variable, and the feature information includes information about kind of objects and information about a partial area provided by dividing a view from the vehicle into a plurality of areas.

20. An object appearance frequency estimating apparatus, comprising:

a storage module;

a frequency data acquisition module operatively connected to the storage module, and configured to acquire frequency data with both previously collected space-time information, including location, time, attractor and weather information, and frequency information for defining an object appearance frequency within a partial area based on the previously collected space-time information, to store the acquired frequency data in the storage module, and to output an appearance frequency signal;

an estimating module operatively connected to the storage module and the frequency data acquisition module, and configured to process the appearance frequency signal, to estimate the object appearance frequency of an approaching object in a predetermined estimation area, to store an estimated object appearance frequency signal of the approaching object in the storage module, and to output the estimated object appearance frequency signal, a calculation module operatively connected to frequency data acquisition module, and configured to receive the estimated object appearance frequency signal, to generate a corresponding reliability degree indicating to what extent the object appearance frequency accurately identifies the approaching object, to store the corresponding reliability degree in the storage module, and to output a corrected object appearance frequency signal; and a notifying module operatively connected to the estimating module, configured to receive the corrected object appearance frequency signal and to generate a driver warning when the corrected object appearance frequency signal of the approaching object comprises at least one of a pedestrian, a bike and an animal in the predetermined estimation area, and configured to generate the driver warning when the corrected object appearance frequency signal comprises at least another of pedestrian, bike, and animal that is different from the at least one of the pedestrian, the bike, and the animal.

21. The object appearance frequency estimating apparatus of claim 20, wherein the calculation module is located in a control center.

22. An object appearance frequency estimating apparatus, comprising:

an image capturing module configured to capture data related to an image of an approaching object in a predetermined estimation area and to output an image signal;

a recognition module operatively connected to the image capturing module and configured to process the image signal based on stored past image recognition parameters to generate an image recognition result;

an estimating module configured to estimate an appearance frequency of the approaching object in the predetermined estimation area and to output an object appearance frequency signal;

a storage module operatively configured to store the image recognition result along with the stored past image recognition parameters; and a notifying module configured to generate a driver warning when the predetermined estimation area is approached, wherein each module is configured to perform each corresponding function for at least two of a pedestrian, a bike, and an animal.

* * * * *